(12) United States Patent
Kuribayashi et al.

(10) Patent No.: US 7,791,688 B2
(45) Date of Patent: Sep. 7, 2010

(54) LIQUID CRYSTAL DEVICE AND ELECTRONIC EQUIPMENT

(75) Inventors: Mitsuru Kuribayashi, Chino (JP); Kazumi Aruga, Fujimi (JP); Akira Inagaki, Suwa (JP)

(73) Assignee: Seiko Epson Corporation (JP)

( * ) Notice: Subject to any disclaimer, the term of this patent is extended or adjusted under 35 U.S.C. 154(b) by 917 days.

(21) Appl. No.: 11/619,905

(22) Filed: Jan. 4, 2007

(65) Prior Publication Data

US 2007/0195230 A1  Aug. 23, 2007

(30) Foreign Application Priority Data

Feb. 20, 2006  (JP)  ............... 2006-042011

(51) Int. Cl.
*G02F 1/1335* (2006.01)
*G02F 1/1337* (2006.01)

(52) U.S. Cl. ...................... 349/106; 349/129
(58) Field of Classification Search ............... 349/106, 349/129–130
See application file for complete search history.

(56) References Cited

U.S. PATENT DOCUMENTS

| | | | |
|---|---|---|---|
| 6,424,398 B1 | 7/2002 | Taniguchi | |
| 6,525,798 B1 | 2/2003 | Yamakita et al. | |
| 6,577,368 B1 | 6/2003 | Yuh et al. | |
| 7,268,757 B2 | 9/2007 | Ben-David et al. | |
| 7,280,176 B2 | 10/2007 | Yuh et al. | |
| 7,352,419 B2 | 4/2008 | Tanose et al. | |
| 7,365,722 B2 | 4/2008 | Lee | |
| 7,466,384 B2 * | 12/2008 | Li | ............... 349/129 |
| 7,545,395 B2 * | 6/2009 | Kurumisawa | ............ 345/690 |
| 2004/0046914 A1 | 3/2004 | Hirota | |
| 2005/0122294 A1 | 6/2005 | Ben-David et al. | |
| 2006/0132660 A1 | 6/2006 | Kurumisawa | |
| 2007/0146602 A1 | 6/2007 | Yuh et al. | |
| 2008/0024410 A1 | 1/2008 | Ben-David et al. | |
| 2008/0030447 A1 | 2/2008 | Ben-David et al. | |
| 2008/0165103 A1 | 7/2008 | Lee | |
| 2008/0192178 A1 | 8/2008 | Ben-David et al. | |
| 2009/0135129 A1 | 5/2009 | Roth et al. | |

FOREIGN PATENT DOCUMENTS

| | | |
|---|---|---|
| JP | 05-273543 | 10/1993 |
| JP | 09-251160 | 9/1997 |
| JP | 2947350 | 2/1999 |

(Continued)

*Primary Examiner*—James A Dudek
(74) *Attorney, Agent, or Firm*—Harness, Dickey & Pierce, P.L.C.

(57) ABSTRACT

A liquid crystal device includes an electrode substrate having a plurality of pixel electrodes; an opposing substrate opposing the electrode substrate; a color filter having color elements colored with four colors or more, each color element opposing each of the pixel electrodes; a liquid crystal disposed between the electrode substrate and the opposing substrate; and an alignment control member extending on a face of at least one of the electrode substrate or the opposing substrate, the face contacting with the liquid crystal, wherein the alignment control member is formed in a position where corresponds to the color element colored with one of at least predetermined three colors among the four colors or more, and an area of which the alignment control member extends is determined by color and differs among the colors.

15 Claims, 17 Drawing Sheets

FOREIGN PATENT DOCUMENTS

| | | |
|---|---|---|
| JP | 2001-337339 | 12/2001 |
| JP | 2002-286927 | 10/2002 |
| JP | 2004-102209 | 4/2004 |
| JP | 2004-102292 | 4/2004 |
| JP | 2004-301961 | 10/2004 |
| JP | 2005-062833 | 3/2005 |
| JP | 2005-173078 | 6/2005 |
| JP | 2005-523465 | 8/2005 |
| KR | 1999-0074556 | 10/1999 |
| KR | 2003-012347 | 2/2003 |

* cited by examiner

LIQUID CRYSTAL DEVICE AND ELECTRONIC EQUIPMENT

BACKGROUND OF THE INVENTION

1. Technical Field

The present invention relates to a liquid crystal device and electronic equipment having the liquid crystal device.

2. Related Art

Various liquid crystal devices including a liquid crystal display (LCD) device have been conventionally known. The LCD has liquid crystal and pixel electrodes corresponding to each pixel which is a unit of an image. The LCD forms an image by controlling alignment directions of the liquid crystal with a voltage applied to each pixel electrode. The LCD's image qualities such as a contrast and a color reproducibility of the front view compete with those of a cathode ray tube (CRT). However, an image displayed by the LCD has a viewing angle dependency and a narrower viewing angel compared to the CRT. Japanese Patent No. 2,947,350 is a first example of related art. The example discloses a way to expand the viewing angle of the LCD by regulating the alignment of the liquid crystal with an alignment regulation means (a domain regulation means).

In order to display an image in color, filters with for example three primary colors of red, green and blue are formed corresponding to each pixel. A pixel in which red, green and blue filters are formed can display these colors. One picture element including at least one set of the red, green and blue filters forms a unit for displaying a colored image, and a desired color can be produced by adjusting the intensity of each color thereof. Multi-color filters colored with other colors in addition to red, green and blue can be used in order to reproduce a wider color range of an image. As such multi color filters, there are six color filters with complementary colors of red, green and blue, which are respectively cyan, magenta and yellow, in addition to the red, green and blue; four complementary color filters colored with green in addition to cyan, magenta and yellow; and four color filters colored with the three primary colors of red, green and blue and white which is transparent and colorless. JP-A-2002-286927 is a second example of related art. The second example discloses various multicolor filters and an electrooptical panel equipped with multi-color filters. In case of a liquid crystal display device having multi-color filters, an aperture of a pixel and a light transmissivity of the filter are adequately adjusted depending on a color of the multicolor filter in order to obtain an appropriate color balance of a picture element.

The alignment regulation means (the domain regulation means) disclosed in the first example is not designed for the liquid crystal display device having the multicolor filter disclosed in the second example. If the alignment regulation means is provided on a light transmissive face of the pixels, it slightly affects the light transmissivity of the pixels. When the light transmissivity of the pixels fluctuates, the brightness of the pixels also fluctuates. Even if the degree of the effects of the alignment regulation means on the light transmissivity of each pixel is substantially same, the degree of the affects of the transmissivity variation on the color balance at each filter differs according to the color of the filter. For this reason, where the viewing angle of the LCD device having the multicolor filter is widened by using the alignment regulation means, the appropriate color balance is not necessarily realized in the widened viewing angle.

SUMMARY

An advantage of the present invention is to provide a liquid crystal device having multi-color filters of which a viewing angle is broaden by an alignment regulation member and in which an appropriate color balance in the broadened viewing angle is realized. Another advantage of the invention is to provide electronic equipment having such liquid crystal display.

A liquid crystal device according to a first aspect of the invention includes an electrode substrate having a plurality of pixel electrodes, an opposing substrate opposing the electrode substrate, a color filter having color elements colored with four colors or more, each color element opposing each of the pixel electrodes, and a liquid crystal disposed between the electrode substrate and the opposing substrate, an alignment control member extending on a face of at least one of the electrode substrate or the opposing substrate and the face contacts with the liquid crystal. The alignment control member is formed in a position where corresponds to the color element colored with one of at least predetermined three colors among the four colors or more, and an area of which the alignment control member extends is determined by color and differs among the colors.

In the liquid crystal device having multi-color filters, one or more pixel having a color element is formed corresponding to each color of the equipped colors, and a color image is formed by changing color intensities of the colors in a unit (hereinafter called "a picture element") composing the color image. In this way, it is possible to reproduce colors situated within a polygon formed with the apexes of the colors in the multi-color filter in gamut. At least with the pixels colored with three colors, it is possible to produce colors situated within a triangle formed with the three apexes of the three colors in the gamut.

An alignment control member provided on a light transmitting face of a pixel affects a light transmissivity of the pixel. When the light transmissivity of the pixel changes, luminance of the pixel changes. Even though the effect of the alignment control member provided in each pixel is same in all the pixels, an effect of the same amount of the light transmissivity change in each color element on a color balance of the picture element differs by the color of the color element.

According to the first aspect of the invention, the areas of which the alignment control members formed in the positions corresponding to at least the color elements colored with three colors composing a picture element extend are different each other. Accordingly, it is possible to prescribe an appropriate area of which the alignment control member extends in each of the three colored pixels depending on the color. The alignment control member controls the alignment direction of the liquid crystal and this widens a viewing angle. Furthermore, it is possible to realize an appropriate color balance in the widened viewing angle by individually setting the area of which the alignment control extends according to the color.

In this case, it is preferable that the above-mentioned predetermined colors be three primary colors of red, green and blue in the liquid crystal device.

Many liquid crystal devices having the multi-color filter have pixels equipped with color elements of the three primary colors with which a wide range of colors can be reproduced from least colors. According to such configuration of the liquid device, the areas of which the alignment control members, which are formed in the positions corresponding to the color elements colored with the three primary colors composing a picture element, extend are different each other. Accordingly, it is possible to prescribe the appropriate area of which the alignment control member extends in each of the three colored pixels forming the picture element depending on the color. The alignment control member controls the alignment direction of the liquid crystal in the pixel having the color element colored with one of the primary three colors and this widens a viewing angle. Furthermore, it is possible to realize an appropriate color balance in the widened viewing angle by individually setting the area of which the alignment control extends according to the color.

It is preferable that the alignment control member be formed in a position where corresponds to the color element that is colored with a color other than the three primary colors, and an area of which the alignment control member extends be determined by color and differs among the colors in the liquid crystal device.

In this case, the areas of which the alignment control members, which are formed in the positions corresponding to the color elements colored with colors other than the three primary colors composing a picture element, extend are different each other. Therefore, it is possible to prescribe the appropriate area of which the alignment control member extends in a color element colored with colors other than the three primary colors pixels forming the picture element depending on the color. In this way, an appropriate color balance of the three primary colors can be obtained in a widened viewing angle. Moreover, the alignment control member controls the alignment direction of the liquid crystal in the pixel having the color element colored with a color other than the three primary colors and this widens a viewing angle. Furthermore, it is possible to realize an appropriate color balance in the widened viewing angle by individually setting the area of which the alignment control extends according to the color.

It is preferable that the predetermined colors be any of complementary colors of the primary three colors of the red, green and blue, which are cyan, magenta and yellow.

In order to realize a brighter liquid crystal device, a liquid crystal device having a complementary color filter that has color elements colored with complementary colors of the three primary colors. With the complementary colors, a wide rage of colors can be reproduced as wide as the primary three colors, and a brighter image can be obtained since the complementary colors are paler than the primary three colors. According to such configuration of the liquid device, the areas of which the alignment control members, which are formed in the positions corresponding to the color elements colored with the complementary colors of the three primary colors composing a picture element, extend are different each other. Accordingly, it is possible to prescribe an appropriate area of which the alignment control member extends in each of the complementary colors of the three colored pixels forming the picture element depending on the color. The alignment control member controls the alignment direction of the liquid crystal in the pixel having the color element colored with one of the complementary colors of the primary three colors and this widens a viewing angle. Furthermore, it is possible to realize an appropriate color balance in the widened viewing angle by individually setting the area of which the alignment control extends according to the color.

It is preferable that the alignment control member be formed in a position where corresponds to the color element that is colored with a color other than the complementary colors of the three primary colors, and an area of which the alignment control member extends be determined by color and differs among the colors.

In this way, the areas of which the alignment control member which is formed in the position corresponding to the color element colored with a color other than the complementary colors of the three primary colors composing a picture element, extends is different each other. Accordingly, it is possible to prescribe an appropriate area of which the alignment control member extends in the pixel colored with the color other than the complementary colors of the three primary colors forming the picture element depending on the color. In this way, an appropriate color balance of the complementary colors of the three primary colors can be obtained in a widened viewing angle. Moreover, the alignment control member controls the alignment direction of the liquid crystal in the pixel having the color element colored with a color other than the complementary colors of the primary three colors and this widens a viewing angle. Furthermore, it is possible to realize an appropriate color balance in the widened viewing angle by individually setting the area of which the alignment control extends according to the color.

It is preferable that a first alignment control member be formed in a position where corresponds to a color element that is colored with a color other than the predetermined colors, an area of which the first alignment control member extends be determined by color and differs among the colors, and this area be different from an area of which a second alignment control member formed in the position corresponding to the color element colored with any of the predetermined color extends.

In this way, the areas of which the alignment control members, which are formed in the positions corresponding to the color elements colored with colors composing a picture element, extend are different each other. Therefore, it is possible to prescribe an appropriate area of which the alignment control member extends in a color element depending on the color. The alignment control member controls the alignment direction of the liquid crystal in the pixel having the color element and this widens a viewing angle. Furthermore, it is possible to realize an appropriate color balance in the widened viewing angle by individually setting the area of which the alignment control extends according to the color.

A liquid crystal device according to a second aspect of the invention includes an electrode substrate having a plurality of pixel electrodes, an opposing substrate opposing the electrode substrate, a color filter having color elements colored with three primary colors of red, green and blue and complementary colors of the three primary colors which are cyan, magenta and yellow, each color element opposing each of the pixel electrodes, a liquid crystal disposed between the electrode substrate and the opposing substrate and an alignment control member extending on a face of at least one of the electrode substrate or the opposing substrate, and the face contacts with the liquid crystal. A first alignment control member is formed in a position where corresponds to the color element colored with one of the three primary colors, an area of which the first alignment control member extends is determined by color and differs among the colors, a second alignment control member is formed in a position where corresponds to the color element colored with one of the complementary colors, and an area of which the second control member extends is determined by color and differs among the colors, An alignment control member provided on a light transmitting face of a pixel affects a light transmissivity of the pixel. When the light transmissivity of the pixel changes, luminance of the pixel changes. Even though the effect of the alignment control member provided in each pixel is same in all the pixels, an effect of the same amount of the light transmissivity change in each color element on a color balance of the picture element differs by the color of the color element.

According to the second aspect of the invention, the areas of which the alignment control members, which are formed in the positions corresponding to the color elements colored with the three primary colors composing a picture element, extend are different each other. Accordingly, it is possible to prescribe the appropriate area of which the alignment control member extends in each of the three colored pixels forming the picture element depending on the color. The alignment control member controls the alignment direction of the liquid crystal in the pixel having the color element colored with one of the primary three colors and this widens a viewing angle. Furthermore, it is possible to realize an appropriate color balance of the colors in a triangle formed in the gamut of the three primary colors of light as well as to widen the viewing angle by individually setting the area of which the alignment control extends according to the color. In the same manner, the alignment control member controls the alignment direction of the liquid crystal in the pixel having the color element colored with one of the complementary colors of the three primary colors. It is possible to realize an appropriate color balance of the colors in a triangle formed in the gamut of the complementary colors of the three primary colors in the widen the viewing angle by individually setting the area of which the alignment control extends according to the color.

A liquid crystal device according to a third aspect of the invention includes an electrode substrate having a plurality of pixel electrodes, an opposing substrate opposing the electrode substrate, a color filter having color elements colored with three primary colors of red, green and blue and complementary colors of the three primary colors which are cyan magenta and yellow, each color element opposing each of the pixel electrodes, a liquid crystal disposed between the electrode substrate and the opposing substrate and an alignment control member extending on a face of at least one of the electrode substrate or the opposing substrate, and the face contacts with the liquid crystal The alignment control member is formed in a position where corresponds to each of the color element, an area of which the alignment control member extends is determined by color, wherein the areas of the alignment control members formed in positions corresponding to the color elements colored with one of the colors and that complementary color are different each other.

According to the third aspect of the invention, the areas of which the alignment control members formed in the positions corresponding to the color elements colored with a color and that complimentary color extend are different each other. Accordingly, it is possible to prescribe an appropriate area of which the alignment control member extends in the pixels having the color elements colored with the color and that complimentary color depending on the color. The alignment control member controls the alignment direction of the liquid crystal and this widens a viewing angle. Furthermore, it is possible to realize an appropriate color balance in the widened viewing angle by individually setting the area of which the alignment control extends according to the color.

A liquid crystal device according to a fourth aspect of the invention includes an electrode substrate having a plurality of pixel electrodes, an opposing substrate opposing the electrode substrate, a color filter having color elements, each color element opposing each of the pixel electrodes, a liquid crystal disposed between the electrode substrate and the opposing substrate and an alignment control member extending on a face of at least one of the electrode substrate or the opposing substrate and the face contacts with the liquid crystal. The color element includes a first color element whose effective area through which light is transmitted is a first area and a second color element whose effective area through which light is transmitted is a second area, an area of which the alignment control member formed in a position corresponding to at least one of the first color element or the second color element extends is determined by color, and the area differs among colors of the first color element or of the second color element.

An alignment control member provided on a light transmitting face of a pixel affects a light transmissivity of the pixel. When the light transmissivity of the pixel changes, luminance of the pixel changes. Even though the effect of the alignment control member provided in each pixel is same in all the pixels, an effect of the same amount of the light transmissivity change in each color element on a color balance of the picture element differs by the effective area through which light is transmitted in the pixel.

According to the fourth aspect of the invention, the areas of which the alignment control members formed in the positions corresponding to the color elements having the same effective area are different each other. Accordingly, it is possible to prescribe an appropriate area of which the alignment control member extends in the pixel having the same effective area depending on the color. The alignment control member controls the alignment direction of the liquid crystal in the pixel having the color element with the same effective area and this widens a viewing angle. Furthermore, it is possible to realize an appropriate color balance of the colors situated within a polygon formed with the apexes of the colors of the color elements with the same effective area in the widened viewing angle by individually setting the area of which the alignment control extends by color.

A liquid crystal device according to a fifth aspect of the invention includes an electrode substrate having a plurality of pixel electrodes, an opposing substrate opposing the electrode substrate, a color filter having color elements, each color element opposing each of the pixel electrodes, a liquid crystal disposed between the electrode substrate and the opposing substrate and an alignment control member extending on a face of at least one of the electrode substrate or the opposing substrate, and the face contacts with the liquid crystal. The color element includes a first color element whose effective area through which light is transmitted is a first area and a second color element whose effective area through which light is transmitted is a second area, an area of which the alignment control member formed in a position corresponding to the first color element or the second color element extends is determined by color, and an third area of which the alignment control member formed in the position corresponding to the first color element extends is different from a fourth area of which the alignment control member formed in the position corresponding to the second color element extends.

In order to obtain an appropriate color balance, the effective areas are adjusted according to the color of the color element in the multi-color filter. According to the fifth aspect of the invention, the areas of which the alignment control members formed in the positions corresponding to the color elements having the different effective area are different each other. Accordingly it is possible to prescribe an appropriate area of which the alignment control member extends in the pixel having the different effective area depending on the color. The alignment control member controls the alignment direction of the liquid crystal in the pixel having the color element with the different effective area and this widens a viewing angle. Furthermore, it is possible to realize an appropriate color balance of the color elements in the widened viewing angle by individually setting the area of which the alignment control extends by color and changing the effective area by color.

In this case, an area of which the alignment control member formed in the position corresponding to the first color element or the second color element extends may be determined by color, and a ratio of the third area of which the alignment control member formed in the position corresponding to the first color element extends to an area of the first color element may be same as a ratio of the fourth area of which the alignment control member formed in the position corresponding to the second color element extends to an area of the second color element.

In this way, the ratio of the area of which the alignment control member formed in the position corresponding to each color element extends to an area of the color element is same among the color elements having different effective areas. Thereby, the extent to which the transmissivity and the like are affected by the alignment control member becomes substantially same among the color elements having the different effective areas. By making the degree of the effect substantially same among the color elements having the different effective areas, it is possible to prevent imbalance of the effective area which was adjusted according to the color of the color element.

It is preferred that an area of which the alignment control member extends be determined by color and differs among the colors of the color elements.

In this ways the areas of which the alignment control members formed in the positions corresponding to the color elements extend are different each other. Accordingly, it is possible to prescribe an appropriate area of which the alignment control member extends in the pixel having the color element colored with one of the colors composing a picture element depending on the color. The alignment control member controls the alignment direction of the liquid crystal and this widens a viewing angle. Furthermore, it is possible to realize an appropriate color balance in the widened viewing angle by individually setting the area of which the alignment control extends according to the color.

It is preferred that the area of which the alignment control member extends in the color element be changed by changing a number of the alignment control members extending in the color element.

By increasing or decreasing the number of the alignment control members, the area of the alignment control members in a color element can be easily changed. Particularly when the areas of the alignment control members are increased or decreased according to the area of the color element, the areas of the alignment control members can be adjusted as maintaining the same gap between the alignment control members.

It is preferred that the area of which the alignment control members extend in the color element be changed by changing an area of each of the alignment control members extending in the color element.

By changing an area of each alignment control member, the total area of the alignment control members in a color element can be easily changed. Particularly by changing a width of the alignment control member in a direction orthogonal to the extending direction or cutting out the mid part of the alignment control member in the extending direction, an area of each alignment control member can be changed, and the total area of the alignment control members in the color element can be changed without changing the extending length, the position and the arrangement of the alignment control member.

It is preferred that the alignment control member extend in a first direction and a second direction, and the alignment control member that is formed corresponding to the single color element include an first alignment control member extending in the first direction and an second alignment control member extending in the second direction.

A viewing angle in one direction can be widened by providing an alignment control member extending in one direction. The viewing angle in one direction means for example a viewing angle of a horizontal direction of the liquid crystal device, a viewing angle of a vertical direction or a viewing angle of an oblique direction. Therefore, with the alignment control members extending in two directions, viewing angles in two directions can be widened.

It is preferred that the alignment control member be a projection or a concave portion formed on the face contacting with the liquid crystal.

In this way, the projection or the concave portion serves as an alignment control means that controls the direction in which the liquid crystal leans. The liquid crystal molecule the liquid crystal aligns vertically to the alignment film when a driving voltage is not applied to the pixel electrodes with which the liquid crystal molecule is aligned. When the projection or the concave portion is formed on the flat face contacting with the liquid crystal layer, the liquid crystal molecules that contacts with the side face of the projection or the concave portion align vertically to the side faces of the projection or the concave portion. It follows that the liquid crystal molecule aligning vertically to the side faces of the projection inclines from the flat face. When a prescribed driving voltage is applied to the pixel electrodes, the liquid crystal molecule turns and aligns in a direction orthogonal to a magnetic field. At this point, the liquid crystal molecule which was initially inclined when the driving voltage was not applied will further incline and changes its direction. Other liquid crystal molecules around the liquid crystal molecule will be affected by this and will be directed in the same direction. In this way, the liquid crystal molecules incline in the same direction.

It is preferred that either the projection or the concave portion or both of the projection and the concave portion may be formed by each of the color elements.

It is preferred that the concave portion be formed by forming a slit in the pixel electrode.

In this way, the concave portion can be formed only by forming a silt in the pixel electrode without separately forming other structure especially for the concave portion.

It is preferred that the concave portion be formed by forming a slit in the pixel electrode.

In an in-plane switching (IPS) type liquid crystal device, the pixel electrodes are formed on one of faces sandwiching the liquid crystal layer, and more than one independent pixel electrodes are formed in a single pixel. A liquid crystal molecule vertically aligns to the pixel electrode face when a driving voltage is not applied, and the liquid crystal molecule changes its direction to substantially parallel with the pixel electrode face. When a driving voltage is applied between the pixel electrodes in the single pixel. The liquid crystal molecule which was initially aligned vertically to the pixel electrode face turns it direction such that it falls down to the two pixel electrodes to which the driving voltage is applied. Accordingly, the gap between pixel electrodes serves as the alignment control member.

Electronic equipment according to a sixth aspect of the invention includes any of the above-described liquid crystal device.

According to the sixth aspect of the invention, the alignment control member controls the alignment direction of the liquid crystal and this widens a viewing angle. Furthermore, it is possible to realize an appropriate color balance in the widened viewing angle by individually setting the area of which the alignment control extends according to the color. With such liquid crystal device, it is possible to realize electronic equipment with a wide viewing angle and a fine color balance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.

First Embodiment

Liquid Crystal Display Device Structure

Figure 1:
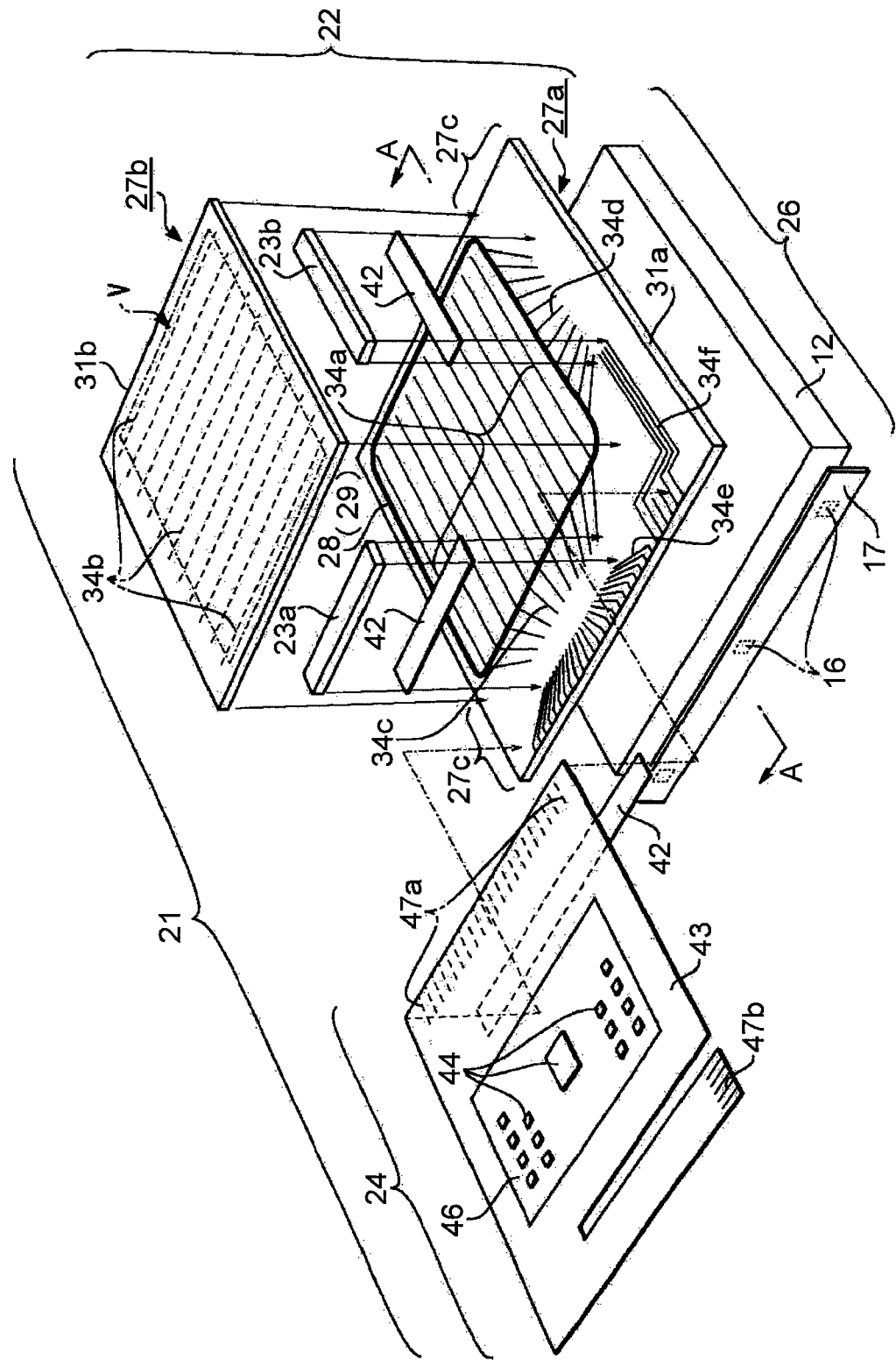
FIG. 1 is an exploded perspective view of a liquid crystal display device according to the invention.
Figure 2:
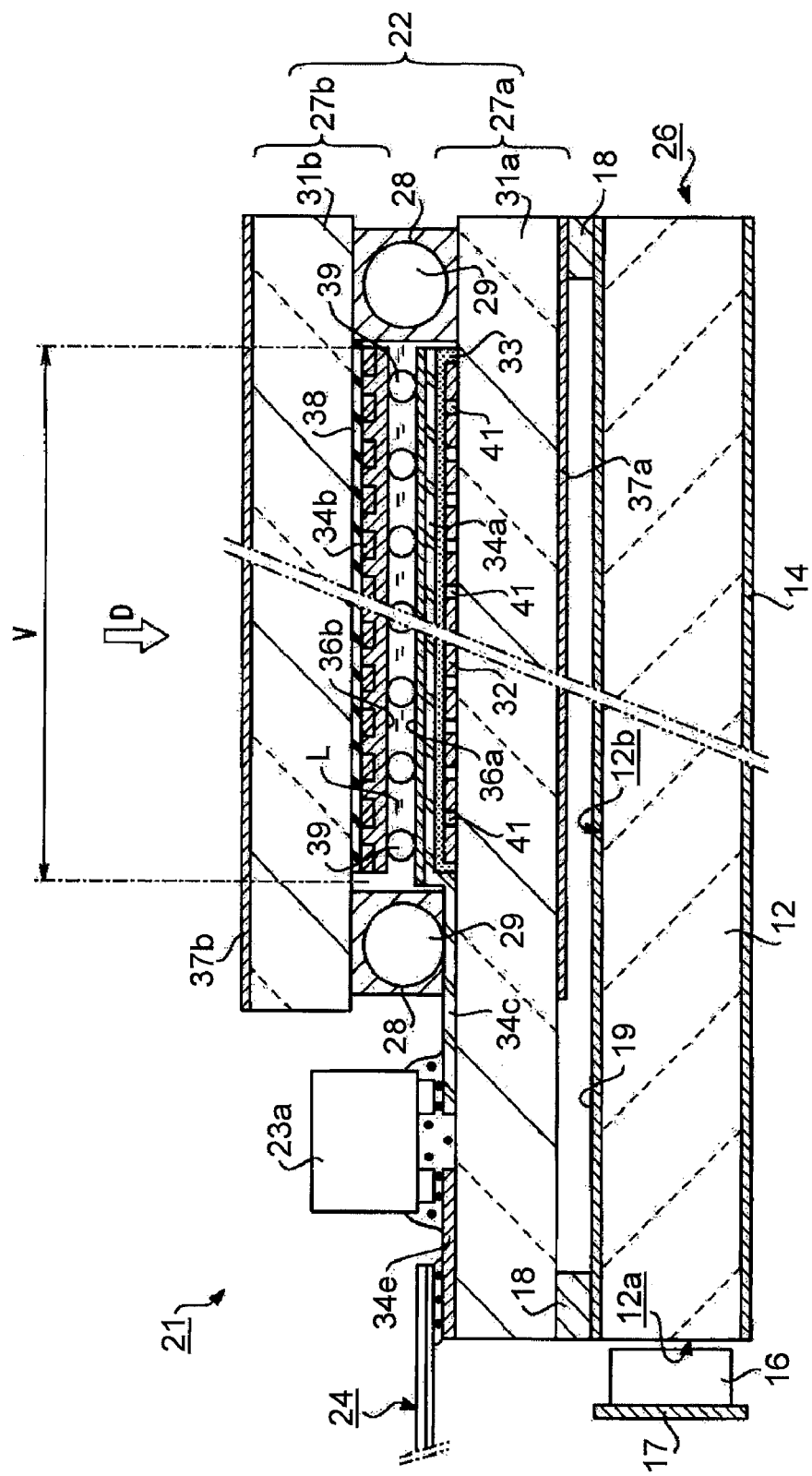
FIG. 2 is a sectional view of the liquid crystal display device along the line A-A in FIG. 1.

Firstly, a structure of a liquid crystal display device is described. FIG. 1 is an exploded perspective view of a liquid crystal display device according to an embodiment of the invention. FIG. 2 is a sectional view of the liquid crystal display device along the line A-A in FIG. 1. As shown in FIG. 1, a liquid crystal display device 21 has a liquid crystal panel 22 and a lighting device 26 on the back side of the liquid crystal panel 22. Liquid crystal driving integrated circuits (ICs) 23a, 23b are mounted on the liquid crystal panel 22 as semiconductor chips and a flexible printed circuit (FPC) 24 is coupled to the liquid crystal panel 22 as a wiring connection element.

The liquid crystal panel 22 is made of a first substrate 27a and a second substrate 27b that are adhered together through a sealing member 28 interposed therebetween. The sealing member 28 can be made by for example providing an epoxy-based resin circularly on the inner surface of the first substrate 27a and the second substrate 27b by screen printing and the like. In the sealing member 28, a conductive member 29 (see FIG. 2) made of a conductive material and formed in a spherical shape or a cylinder shape is dispersed.

As shown in FIG. 2, the first substrate 27a has a plate-shape base member 31a made of a transparent glass, a transparent plastic or the like. A reflective film 32 is formed on the inner face (the top face in FIG. 2) of the base member 31a, on top of which an insulating film 33 is formed, on top of which a first electrode 34a is formed in a stripe form (see FIG. 1) when it is viewed from the direction pointed by the arrow D, and on top of which an alignment film 36a is formed. A polarizing plate 37a is attached with an adhesive and the like on the outer face (the bottom face in FIG. 2) of the base member 31a.

A gap between two adjacent strips is drawn wider than an actual gap in FIG. 1 in order to make the arrangement of the first electrodes 34a recognizable so that the number of the first electrodes 34a in FIG. 1 is smaller than the actual device. Therefore, more first electrodes 34a are provided on the base member 31a in the actual device. The first substrate 27a here corresponds to an electrode substrate or an opposing substrate.

The second substrate 27b has a plate-shape base member 31b made of a transparent glass, a transparent plastic or the like as shown in FIG. 2. A color filter 38 is formed on the inner face (the bottom face in FIG. 2) of the base member 31b, on top of which a second electrode 34b extending in a direction orthogonal to the first electrode 34a is formed in a stripe form (see FIG. 1) when it is viewed from the direction pointed by the arrow D, and on top of which an alignment film 36b is formed. A polarizing plate 37b is attached with an adhesive and the like on the outer face (the top face in FIG. 2) of the base member 31b.

In the same manner as the first electrodes 34a, a gap between two adjacent strips is also drawn wider than an actual gap in FIG. 1 in order to make the arrangement of the second electrodes 34b recognizable so that the number of the second electrodes 34b in FIG. 1 is smaller than the actual device. Therefore, more second electrodes 34b are provided on the base member 31b in the actual device. The second substrate 27b here corresponds to an opposing substrate or an electrode substrate.

As shown in FIG. 2, a liquid crystal L is enclosed in a so-called cell gap that is the area bounded by the first substrate 27a, the second substrate 27b and the sealing member 28. A spacer 39 formed in a tiny sphere shape is dispersedly provided in the plural number on the inner face of the first substrate 27a or the second substrate 27b. These spacers 39 existing in the cell gap maintain the cell gap even throughout the substrate.

The first electrode 34a is arranged so as to orthogonally cross the second electrode 34b and the crossing points of these electrodes are arranged in a dot-matrix pattern when they are viewed from the direction of the arrow D in FIG. 2. Each crossing point in the dot-matrix corresponds to a single pixel. The color filter 38 is formed so as to have a color element region (see FIG. 3) in which a single color element 53 (see FIG. 3) situated at a single pixel. In case of the three primary color filter, color elements of red (R), green (G) and blue (B) are arranged in a certain pattern, for example, a stripe pattern, a delta pattern, a mosaic pattern or the like when they are viewed from the direction of the arrow D in FIG. 2. The above-mentioned each pixel corresponds each color element 53 which is colored with R, G or B. A minimum unit (hereinafter called "picture element") of an image is composed of a set of the three pixels respectively colored with R, G, B.

By emitting light selectively through the plurality of the pixels or the picture elements arranged in the dot-matrix, an image such as a letter, a number and the like can be displayed on the outer side of the second substrate 27b of the liquid crystal panel 22. The area where such image can be display is an effective pixel region and a square plane area designated by the arrow V in FIG. 1 and FIG. 2 is an effective display region.

The reflective film 32 shown in FIG. 2 is made of a light reflective material such as an APC alloy, Al (aluminum) and the like and has an opening 41 at a position corresponding to each pixel where there is the crossing point of the first electrode 34a and the second electrode 34b. Accordingly, the openings 41 are arranged in the same dot-matrix pattern as the pixels when they are viewed from the direction of the arrow D in FIG. 2.

The first electrode 34a and the second electrode 34b are made of a conductive material such as indium tin oxide (ITO) and indium zinc oxide (IZO) and formed so as to have an appropriate electric resistance and an appropriate transmissivity. A film thickness of these electrodes is about 0.1 μm. The alignment films 36a, 36b are formed by providing a polyimide based resin and making it into a uniform film. In case of a multi-domain vertical alignment (MVA) liquid crystal display device, liquid crystal molecule La (see FIG. 11) of the liquid crystal L aligns substantially vertical to the alignment film 36a or the alignment film 36b when a voltage is not applied between the first electrode 34a and the second electrode 34b. In other words, the liquid crystal molecules align substantially perpendicular to the surface of the first substrate 27a and the second substrate 27b.

As shown in FIG. 1, the first substrate 27a has a larger area than the second substrate 27b so that the first substrate 27a has a substrate protruding part 27c that protrudes out from the second substrate 27b when these substrates are adhered together with the sealing member 28. Various wirings including an extraction electrode 34c that extends from the first electrode 34a, an extraction electrode 34d that conducts with the second electrode 34b on the second substrate 27b through the conductive member 29 (see FIG. 2) situating in the sealing member 28, an input bump for the liquid crystal driving IC 23a or a metal wiring 34e coupled to an input terminal, and a metal wiring 34f coupled to an input bump for the liquid crystal driving IC 23b are formed respectively in an appropriate pattern on the substrate protruding part 27c.

In this embodiment, the extraction electrode 34c that extends from the first electrode 34a and the extraction electrode 34d that conducts with the second electrode 34b are made of the same materials as those of the electrodes, which is a conductive oxide or ITO in this case. The metal wirings 34e, 34f that are the input wirings for the liquid crystal driving IC 23a, 23b respectively are made of a metal material that has a relatively low electric resistance such as the APC alloy. The APC alloy is mainly composed of Ag and a small amount of alloy of Pd and Cu. For example, the APC alloy contains Ag for 98%, Pd for 1% and Cu for 1%.

The liquid crystal driving IC 23a and the liquid crystal driving IC 23b are adhered and mounted onto the substrate protruding part 27c by an anisotropic conductive film (ACF) 42. In other words, a semiconductor chip is directly mounted on the substrate in this embodiment, which is called a chip-on glass (COG) type liquid crystal panel. In this COG type mounting structure, conductive particles in the ACF 42 electrically couple the input bumps of the liquid crystal driving IC 23a, 23b with the metal wirings 34e, 34d and also couple output bumps of the liquid crystal driving IC 23a, 23b with the extraction electrodes 34c, 34d.

The FCP 24 has a flexible resin film 43, a circuit 46 including a chip component 44, and a metal wiring terminal 47a as shown in FIG. 1. The circuit 46 is directly mounted on the surface of the resin film 43 by a conductive coupling method such as soldering. The metal wiring terminal 47a is made of the APC alloy, Cr, Cu or other conductive materials. A part of the FPC 24 where the metal wiring terminal 47a is formed is coupled to a part of the first substrate 27a where the metal wiring 34e and the metal wiring 34f are formed with the ACE 42. The conductive particles contained in the ACF 42 electrically couple the metal wirings 34e, 34f of the substrate to the metal wiring terminal 47a of the FPC 24.

An external connecting terminal 47b is formed on a peripheral part of the FPC 24 on the opposite side to the metal wiring terminal 47a. The external connecting terminal 47b is coupled to an unshown external circuit. The liquid crystal driving ICs 23a, 23b are driven based on a signal transmitted from the unshown external circuit. A scan signal is then supplied to either one of the first electrode 34a or the second electrode 34b and a data signal is supplied to the other. Thereby each pixel of the picture element arranged in the dot-matrix form in the effective display region V is controlled by an applied voltage. Accordingly, the alignment of the liquid crystal L is controlled by each pixel.

The lighting device 26 that serves as a back light shown in FIG. 1 has a light guiding member 12 made of an acrylic resin and the like, a diffusing sheet 19 provided on a light emitting face 12b of the light guiding member 12, a reflective sheet 14 provided on the opposite face to the light emitting face 12b of the light guiding member 12, and a light emitting diode 16 (LED) which is a light source.

The LED 16 is held by a LED substrate 17 and the LED substrate 17 is attached to for example a supporting member (unshown in the figure) which is formed so as to be integrated with the light guiding member 12. The LED substrate 17 is installed in a predetermined position of the supporting member in such a way that the LED 16 opposes a light pickup face 12a which is an end face of the light guiding member 12. Reference number 18 designates a buffer material that cushions the shock given to the liquid crystal panel 22.

When the LED 16 emits light, a light beam form the LED is picked up by the light pickup face 12a and guided through the inside of the light guiding member 12. The light beam then propagates through the light guiding member 12 as it is reflected by the faces of the reflective sheet 14 and the light guiding member 12, and the goes outside through the light emitting face 12b and the diffusing sheet 19 as the flat light.

In the liquid crystal display device 21 having the above-described structure according to the embodiment when external light such as sunlight and room lights is bright enough, the external light is guided into the liquid crystal panel 22 from the second substrate 27b side as shown in FIG. 2, the light beam passes through the liquid crystal L, reflected by the reflective film 32 and again supplied to the liquid crystal L. The alignment of the liquid crystal L is controlled in each pixel by the voltage applied between the first electrode 34a and the second electrode 34b that sandwich the liquid crystal L. Thereby, the transmissivity of the light beam supplied to the liquid crystal L is controlled by each pixel. A color of a picture element that is recognized from the outside of the liquid crystal panel 22 is decided by luminance of pixels colored with R, G, B that form the picture element. An image such as a letter, a number and the like is composed of a combination of such picture elements and thereby the image can be displayed on the outside of the liquid crystal panel 22. This is the mechanism of the reflective type display.

When the amount of the external light is not sufficient, the LED 16 emits light and flat light is emitted from the light emitting face 12b of the light guiding member 12. The flat light is then supplied to the liquid crystal L through the openings 41 formed in the reflective film 32. In the same way as the reflective type display, the supplied light beam is transmitted with a corresponding transmissivity of each pixel through the liquid crystal L whose alignment is controlled, and thereby an image is displayed to the outside. This is the mechanism of the transmissive type display.

Color Filter Substrate Structure

Figure 3A:
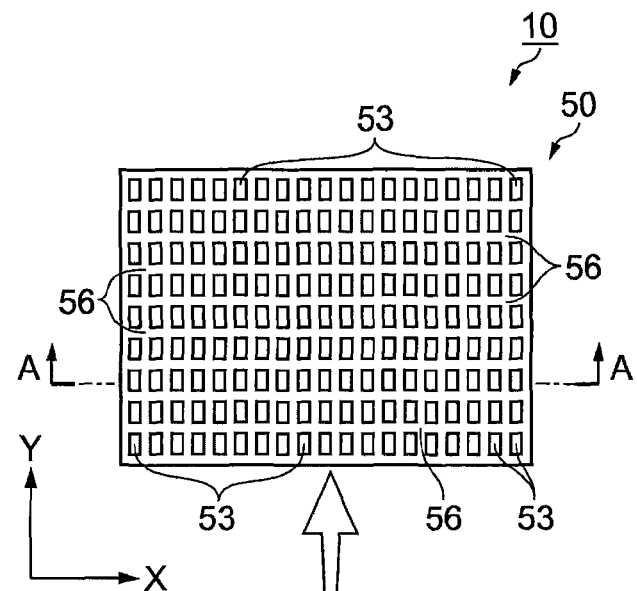
FIG. 3A is a schematic view showing a planar structure of a color filter and FIG. 5B is a schematic view showing a planar structure of a mother substrate on which a plurality of second substrates is formed.

Next, a structure of a color filter including the color filter 38 formed on the second substrate 27b is described. FIG. 3A is a schematic view showing a planar structure of a color filter according to an embodiment and FIG. 3B is a schematic view showing a planar structure of a mother substrate on which a plurality of the second substrates is formed.

A color filter 50 includes a plurality of color element regions 52 (see FIG. 4 and FIG. 8E) arranged in a dot pattern or a dot matrix pattern in this embodiment on a surface of a rectangular substrate made of glass, plastic or the like, the color elements 53 provided in the color element regions 52, and a protection film formed over the color element regions 52. FIG. 3A shows a plan view of the color filter from which the protection film is removed.

Figure 3B:
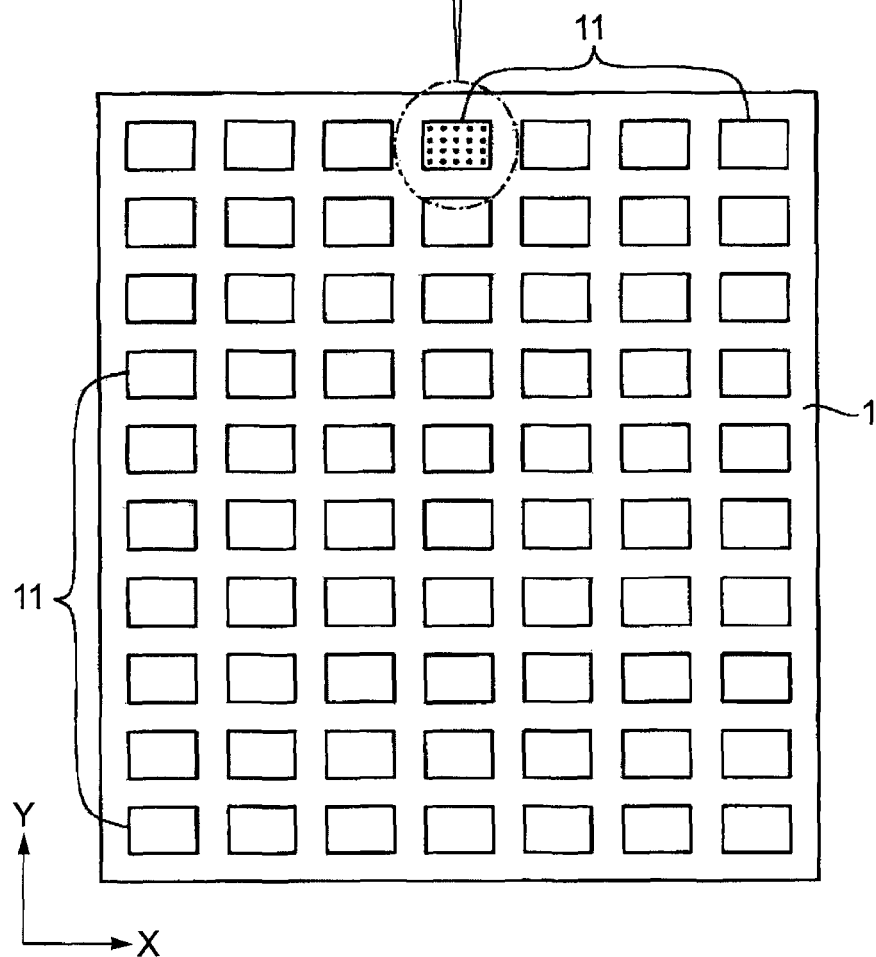
Figure 4A:
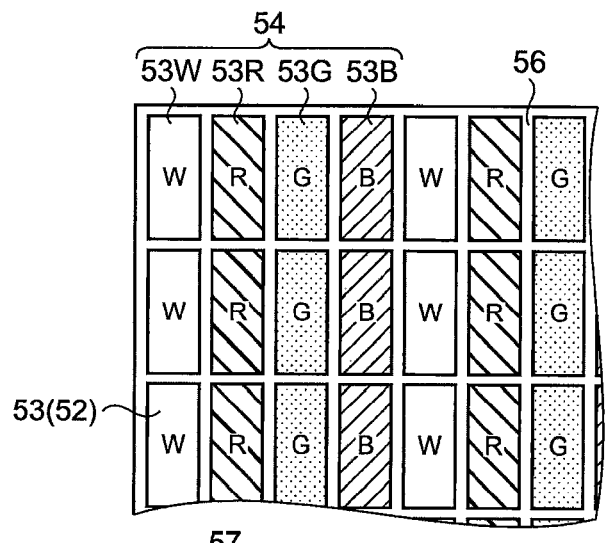
FIG. 4A is a plan view showing an arrangement example of color elements of a four color filter and FIGS. 4B and 4C are plan views showing arrangement examples of color elements of a six color filter.
Figure 4B:
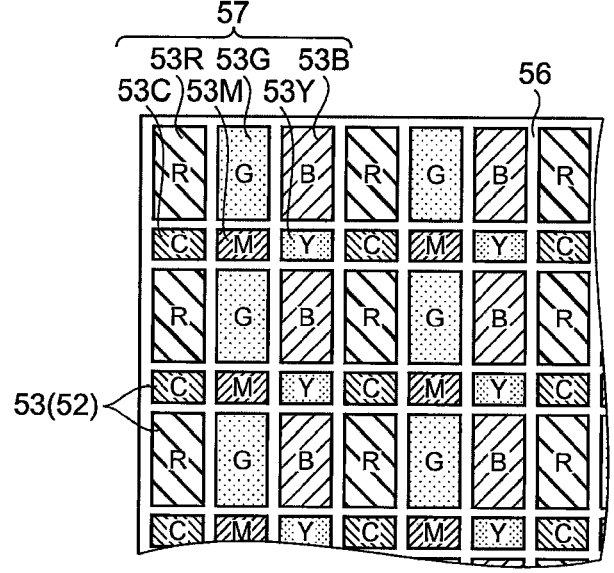
Figure 4C:
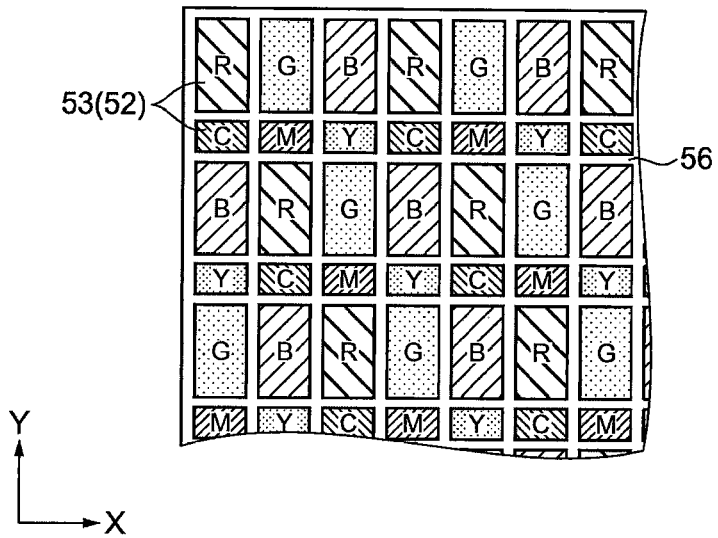

A square-shaped color filter substrate 10 on which the color filter 50 is formed is cut out from a large mother substrate 1 as shown in FIG. 3B. More specifically, a pattern of the color filter 50 is firstly formed in a surface of each color filter forming region 11 that is provided in the plural number in the mother substrate 1. Subsequently, a groove for cutting is formed on the peripheral of each color filter forming region 11. The mother substrate 1 is cut along the groove and the square-shaped color filter substrate 10 on which the color filter 50 is formed is obtained, Next, an arrangement of the color elements will be described. The color element 53 is composed of a partition wall 56 made of an opaque resin material and patterned in a lattice-like pattern and the color element regions 52 arranged in a dot-matrix pattern. Each color element region 52 has a square shape defined by the partition wall 56 and each region is filled with a color material. FIG. 4 is a plan view showing arrangement examples of the color elements. FIG. 4A shows an arrangement example of a four color filter and FIGS. 4B and 4C show arrangement examples of a six color filter. Arrangements include for example a strip pattern arrangement, a mosaic pattern arrangement, a delta pattern arrangement and the like. In the strip pattern arrangement, all the color elements 53 in the same column in the matrix have the identical color. In the mosaic pattern arrangement, the color sequence of the color elements 53 in a row of the matrix is displaced by one element in each row. In case of a three color filter, any three color elements 53 vertically or horizontally aligned have the three different colors in the mosaic pattern arrangement. In the delta pattern arrangement, the color sequence of the color elements 53 in a row of the matrix differs by each row. In a case of the three color filter, any three adjacent color elements 53 have the three different colors.

In the four color filter shown in FIG. 4A, each color element 53 is made of a color material colored with either red (R), green (G), blue (B) or clear colorless (W). A sequence of adjacently formed color elements 53 colored with red (R), green (G), blue (B) and clear colorless (W), which are the color elements 53R, 533G, 53B and 53W, forms a filter (hereinafter called "picture element filter")) that corresponds to a minimum unit picture element composing an image. A full color display is possible by selectively transmitting light through one of the color elements 53R, 53G, 53B and 53W or any combination thereof in each single picture element filter. The partition wall 56 made of the opaque resin material serves as a black matrix. Picture element filter 54 is arranged in the stripe pattern in the four color filter shown in FIG. 4A.

In the six color filter shown in FIG. 4B, each color element 53 is made of a color material colored with either red (R), green (G), blue (B), cyan (C), magenta (M) or yellow (Y). A sequence of adjacently formed color elements 53 colored with red (R), green (G), blue (B), cyan (C), magenta (M) and yellow (Y), which are the color elements 53R, 53G, 53B, 53C, 53M and 53Y, forms a picture element filter 57 that corresponds to a single picture element. The three primary colors of light, red (R), green (G) and blue (B) are horizontally aligned (the X direction in FIG. 4) and cyan (C), magenta (M) and yellow (Y) which are the complementary colors of red (R), green (G) and blue (B) are correspondingly arranged next to the color which should be complemented. A full color display is possible by selectively transmitting light through one of the color elements 53R, 53G, 53B, 53C, 53M and 53Y or any combination thereof in each single picture element filter. Picture element filter 57 is arranged in the stripe pattern in the six color filter shown in FIG. 4B. The picture element filter 57 is arranged in the mosaic pattern in the six color filter shown in FIG. 4C.

In the six color filter shown in FIG. 4B and FIG. 4C, the areas of the color elements colored with cyan (C), magenta (M) and yellow (Y) that are the complementary colors of red (R), green (G) and blue (B), which are the color elements 53C, 53M and 53Y, are smaller than the areas of the color elements colored with red (R), green (G) and blue (B), which are the color elements 53R, 53G and 53B. This is because the brightness of the light beam went through the color element differs by color even the light beam is generated by the same light source and this difference in the brightness can be corrected by adjusting the area of each color element 53. Such areas of the color elements 53 are for example 30 μm×100 μm or 30 μm×60 μm and 30 μm×20 μm. A so-called element bitch which is a gap between the color elements 53 is for example 45 μm.

Next, a droplet discharge method used for forming a color filter including the above-described color filter 50 will be described. Discharging techniques of the droplet discharge method include an electrification controlling method, a pressurizing and oscillating method, an electromechanical converting method, an electro-thermal converting method, an electrostatic attracting method and the like. In the electrification controlling method, an electric charge is given to a material by an electrification electrode and the material is discharged from the nozzle. The discharging direction of the material can be controlled by a deflecting electrode. In the pressurizing and oscillating method, a high pressure of about 30 kg/cm² is applied to a material so as to discharge the material from the tip of the nozzle. When a control voltage is not applied, the material goes straight and is discharged from the nozzle. When the control voltage is applied, due to an electrostatic repulsion generated in the material, the material is dispersed and will not be discharged from the nozzle. In the electrothermal converting method, a piezoelectric element deforms when it receives a pulsed electric signal. The electrothermal converting method utilizes this piezoelectric element's property and the deformation of the piezo element gives a pressure through a flexible substance to a space storing a material. The material is then pushed out by the pressure from the space and discharged from the nozzle.

In the electrothermal converting method, the material is rapidly gasified so as to generate bubbles by a heater provided in a space storing the material, so that the material in the space is pushed out and discharged by the pressure of the bubbles. In the electrostatic attracting method, a micro-pressure is applied to a space storing the material and a meniscus of the material is formed in the nozzle, in which state an electrostatic attractive force is applied so as to draw the material out. In addition to these methods, such techniques as using a viscosity variation of a fluid due to an electric field, and blowing the material out by an electric discharge spark, and the like are also applicable. The advantage of the droplet discharge method is that the amount of waste in the used material becomes less, and the desired amount of the material can be surely disposed on a desired position. In this embodiment, in terms of variety of the applicable liquid material and controllability of a droplet, the above-mentioned piezo method is adopted.

Figure 5A:
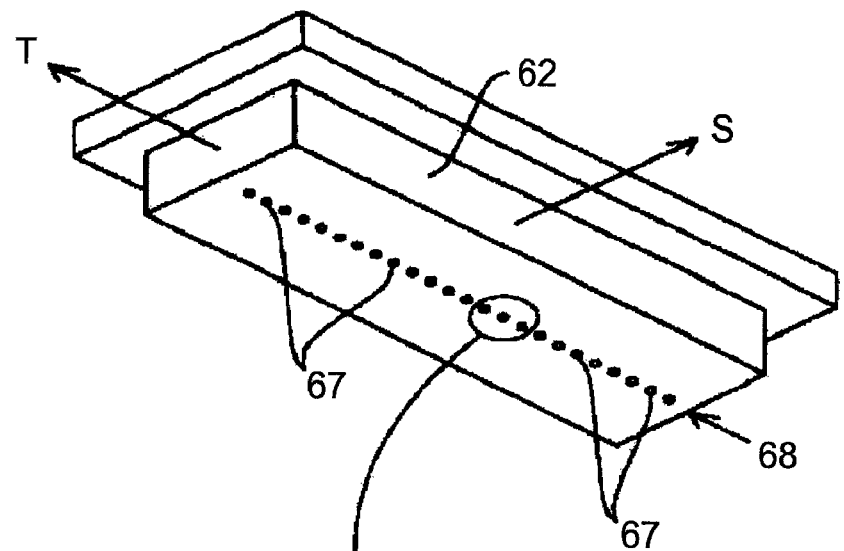
FIG. 5 is a perspective view schematically showing the exterior of a droplet discharge head.
Figure 5B:
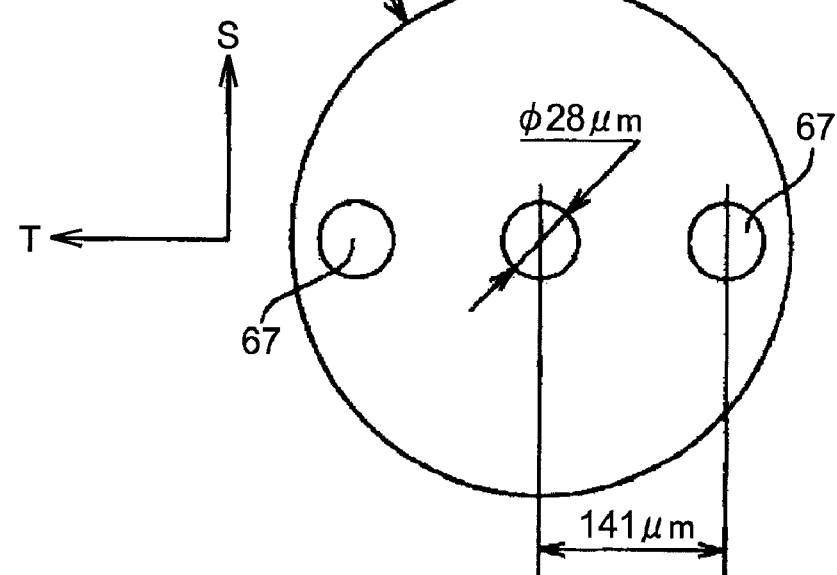

Next, a droplet discharge head of a device manufacturing machine used for manufacturing the device according to the embodiment of the invention by the droplet discharge method is described. This device manufacturing machine is a droplet discharge device (an ink-jet device) that manufactures a device by discharging (dropping) droplets onto a substrate from a discharge head. FIG. 5A is a perspective view schematically showing the exterior of a droplet discharge head. FIG. 5B shows a nozzle arrangement. A droplet discharge head 62 has for example a nozzle row 68 in which a plurality of discharge nozzles 67 is arranged. The number of the discharge nozzles 67 is for example 180, an opening size of the discharge nozzle 67 is for example 28 μm, and a pitch between the discharge nozzles 67 is for example 141 μm (see FIG. 5B). The reference direction S shown in FIG. 5A is a main scanning direction in which the droplet discharge head 62 moves relatively with a substrate in order to let a droplet land on a desired position of the substrate. The arrangement direction T is the direction in which the discharge nozzles 67 are aligned in the nozzle row 68.

Figure 6A:
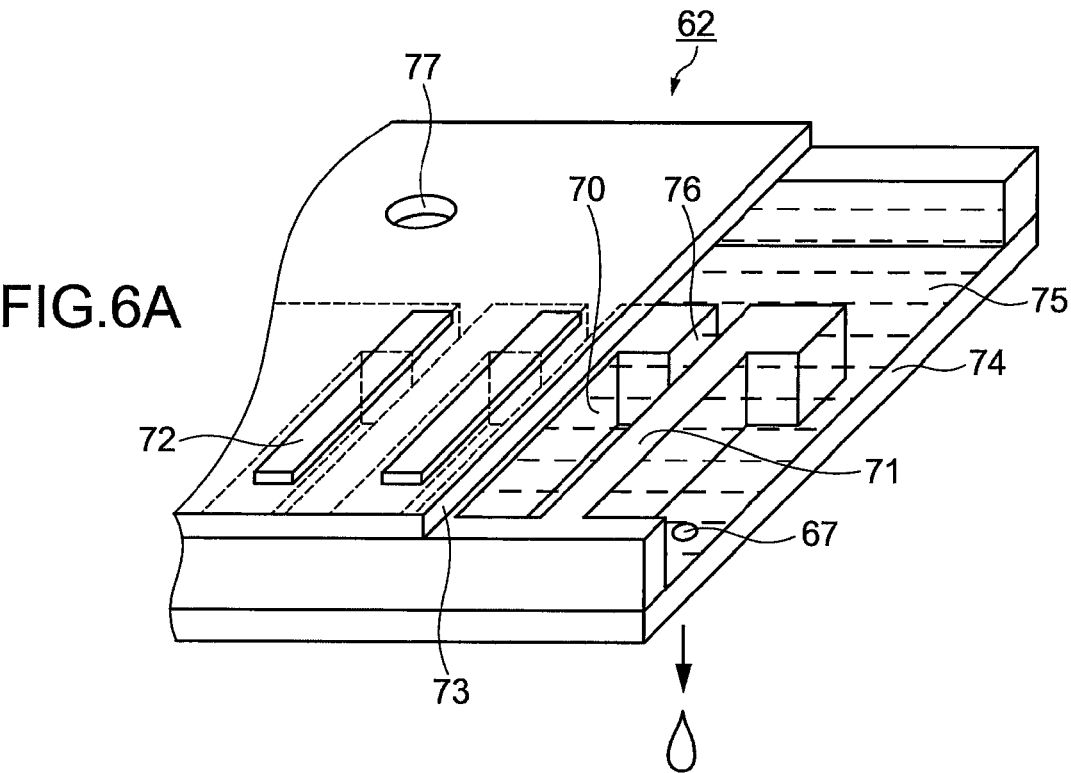
FIG. 6A is a perspective view showing a structure of the droplet discharge head and FIG. 6B is a sectional view showing structural details of a discharge nozzle part of the droplet discharge head.
Figure 6B:
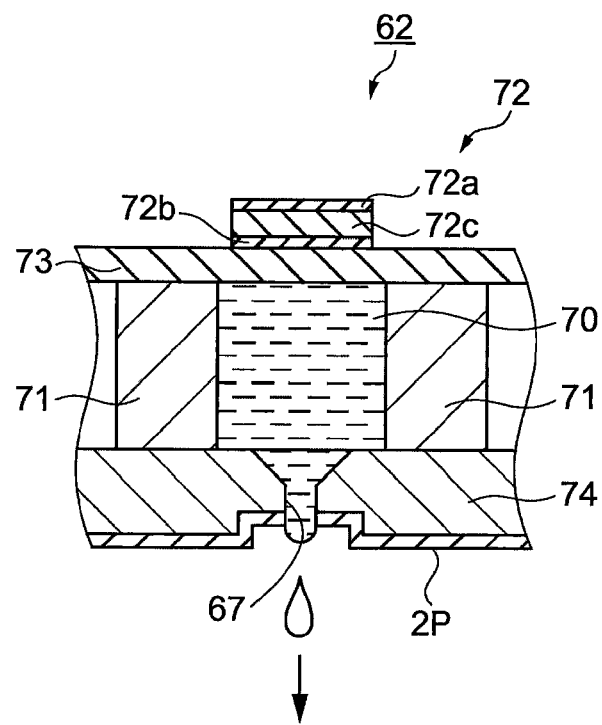

FIG. 6A is a perspective view showing a structure of the droplet discharge head and FIG. 6B is a sectional view showing structural details of the discharge nozzle part of the droplet discharge head. As shown in FIG. 6A and FIG. 6B, each droplet discharge head 62 has a vibrating board 73 and a nozzle plate 74. A liquid storage 75 is provided between the vibrating board 73 and the nozzle plate 74. The liquid storage 75 is always filled with a liquid material that is supplied from a liquid material tank (not shown in the figures) through an opening 77. A head partition wall 71 is located between the vibrating board 73 and the nozzle plate 228. The head partition wall 71 is provided in a plural number. An area surrounded by the vibrating board 73, the nozzle plate 74 and a pair of the head partition walls 71 is a cavity 70. The number of the cavities 70 and the number of the discharge nozzles 67 are same because the cavity 70 is provided corresponding to the discharge nozzle 67. A liquid material is supplied to the cavity 70 from the liquid storage 75 through a feed opening 76 located between the pair of the partition walls 71.

An oscillator 72 is provided on the vibrating board 73 corresponding to each cavity 70. The oscillator 72 includes a piezoelectric element 72c, a pair of electrodes 72a, 72b that sandwich the piezoelectric element 72c. The liquid material is discharged form the correspondent discharge nozzle 67 by applying a driving voltage to the pair of electrodes 72a, 72b. A liquid repellent process layer 2P that shows repellency to the liquid material is formed on the outer surface of the nozzle plate 74 in order to prevent a part of the liquid material discharged from the discharge nozzle 67 from sticking to the nozzle plate 74.

A controller (unshown in the figures) controls a voltage applied to the piezoelectric element 72c which is the driving signal so that the discharge of the liquid material from the discharge nozzle 67 can be controlled. To be more specific, it is possible to control the volume of the droplet discharged from the discharge nozzle 67, the number of the droplets discharged per unit time, a distance between the droplets landed on a substrate and the like. More than one droplet can be simultaneously discharged in the nozzle arrangement direction T with the pitch of the discharge nozzle 67 and within the length of the nozzle row 68 by for example selecting the discharge nozzles 67 actually used for the discharge among the plurality of the discharge nozzles 67 in the nozzle row 68. The distance between the droplets landed on a substrate can be changed by adjusting the discharge nozzles 67 actually used for the discharge in the reference direction S. The volume of the droplet discharged from each discharge nozzle 67 can be varied within a range of 1-300 picoliter (pl).

Manufacturing Method of Color Filter Substrate

Figure 7:
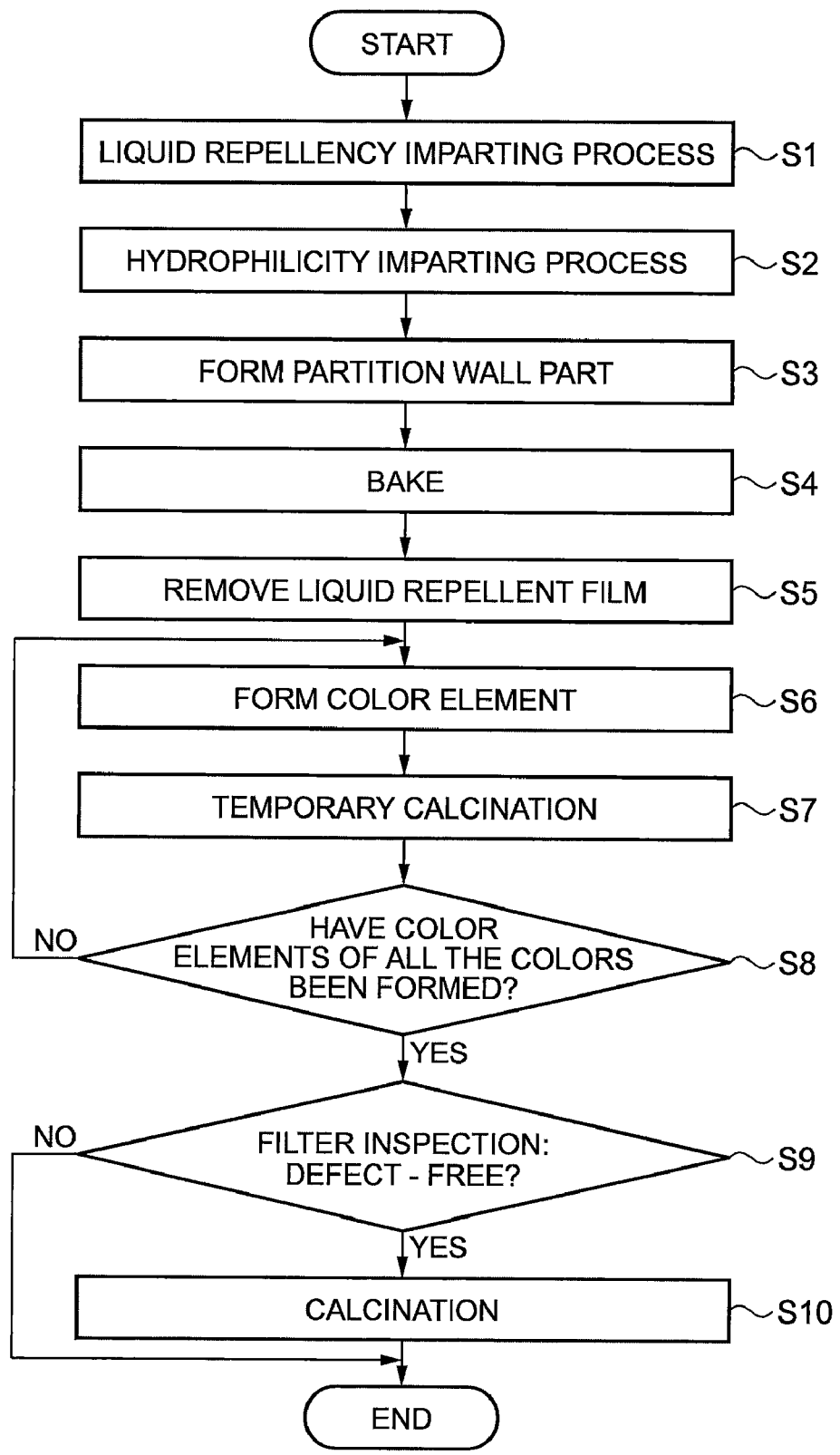
FIG. 7 is a flowchart showing manufacturing processes of a color filter substrate.

Next, a manufacturing method of a color filter substrate will be described with reference to FIG. 7 and FIG. 8. FIG. 7 is a flowchart showing manufacturing processes of the color filter substrate. FIGS. 5A through 8G are sectional views schematically showing manufacturing processes of the color filter substrate.

As shown in FIG. 7, a method of manufacturing the color filter substrate 10 in this embodiment includes a liquid repellency imparting process (step S1) in which a surface of a glass substrate 81 (the mother substrate 1, see FIG. 3) is treated so as to acquire a liquid repellency, and a hydrophilicity imparting process (step S2) in which a certain surface area of the glass substrate 81 is treated to have hydrophilicity. The certain area was treated with the above-mentioned liquid repellency imparting process and corresponds to the area where the partition wall 56 is formed. The method further includes a partition wall forming process (step S3) and a color element forming process (step S6). In the partition wall forming process, partition walls that define a plurality of the color element regions 52 on the glass substrate 81 are formed. In the color element forming process, functional liquids containing different kinds of color element forming materials are discharged onto the plurality of the color element regions 52 and the color elements 53 colored with more than one kind are formed.

Figure 8A:
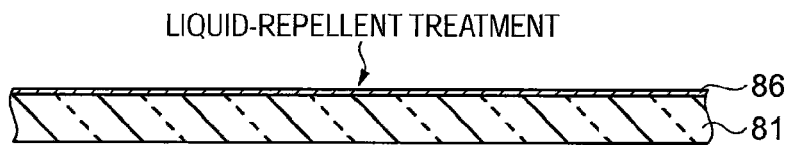
FIGS. 8A through 8G are sectional views schematically showing manufacturing processes of the color filter substrate.
Figure 8B:
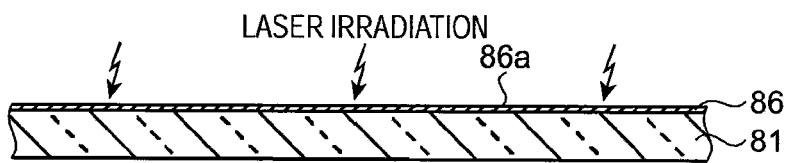

The step S1 shown in FIG. 7 is the liquid repellency imparting process. In the step S1, a thin film 86 is formed on the surface of the glass substrate 81 and liquid repellency is imparted there as shown in FIG. 8A. To form the thin film 86 in this embodiment, fluoroalkylsilane (FAS) or hexamethyldisilane (HMDS) are used as a material having the liquid repellency and the thin film 86 mostly composed of a monomolecular film is formed. More specifically, a method to form a self-assembled layer on the surface of the glass substrate 81 can be adopted.

According to the method of forming a self-assembled layer, a self-assembled layer made of an organic molecular film and the like is formed on the surface of the glass substrate 81. The organic molecular film has a functional group which is capable of being combined with the substrate 81. The organic molecular film also has a functional group which modifies the quality of (i.e., controls the surface energy of) the substrate surface such as a hydrophobic group positioned at the opposite side of the substrate-combining functional group, and a carbon straight chain or a carbon chain partially branched off, which couples the substrate-combining functional group to the surface quality modifying functional group. The organic molecules are coupled to the glass substrate 81, self-assembled and form a molecular film such as a monomolecular film.

The self assembled layer is a film composed of combinative functional groups which can react with the constituent atoms of an under-layer of the glass substrate 81, and other straight-chain structures. The film is made of the compound that is highly oriented by interactions between straight-chain structures. Such self assembled layer is formed of aligning oriented mono-molecules so that it can be made extremely thin, and moreover it can be very uniform at a molecular level. In other words, since the same kind of molecules is positioned in the film surface, it has a very uniform film surface and an excellent liquid repellency can be imparted to the film surface.

As such highly oriented compound, for example, fluoroalkylsilane can be adopted. A self-assembled layer in which compounds are oriented such that fluoroalkyl groups are positioned in the surface of the layer can be formed by using fluoroalkylsilane. In this way, the liquid repellency is evenly given to the surface of the film.

As the chemical compounds that can form the self-assembled layer, fluoroalkylsilanes (hereinafter called "FAS") such as heptadecafluoro-1,1,2,2 tetrahydrodecil-triethoxysilane, heptadecafluoro-1,1,2,2 tetrahydrodecil-trimethoxysilane, heptadecafluoro-1,1,2,2 tetrahydrodecil-trichlorosilane, heptadecafluoro-1,1,2,2 tetrahydrooctyl-triethoxysilane, heptadecafluoro-1,1,2,2 tetrahydrooctyl-trimethoxysilane, heptadecafluoro-1,1,2,2 tetrahydrooctyl-trichlorosilane and trifluoropropyltrimethoxysilane can be used. These compounds can be used alone or any combination thereof. By using the FAS, it is possible to obtain a fine liquid repellency and a fine adherence with the glass substrate 81.

The FAS is generally represented by RnSiX(4-n): wherein "n" is an integer of 1-3; "X" is a hydrolysis group such as a methoxy group, an ethoxy group and a halogen atom; "R" is a fluoroalky group having a structure of $(CF_3)(CF_2)_x(CH_2)_y$ (where x is an integer of 0-10 and y is an integer of 0-4). If more than one "R" or "X" is coupled to Si, all of the "R" or "X" may be same or different. The hydrolysis group denoted as "X" forms silanol by the hydrolysis, reacts with a hydroxyl group in the under-layer of the glass substrate 81, and coupled to the glass substrate 81 through a siloxane bond. "R" has a fluoro group such as $(CF_2)$ and the like on the surface so that it modifies the quality of the under-layer surface of the glass substrate 81 into the surface which is hardly wet (has a low surface energy).

The self-assembled layer made of an organic molecular film and the like can be formed on the glass substrate 81 when the above-mentioned chemical compound material and the glass substrate 81 are contained in the same sealed container and left for two to three days at room temperature. Alternatively, the organic film can be formed on the glass substrate 81 by keeping the whole sealed container at a temperature of 100° C. for about 1-3 hours. It should be understood that, although the organic film is formed from a gas phase in the above forming method, such self-assembled layer may also be formed from a liquid phase. For example the self assembled layer is formed on the glass substrate 81 by immersing the glass substrate 81 in a solution which contains the chemical compound material cleaning the substrate, and then drying it. Before forming the self-assembled layer, a pre-treatment process is preferably performed. Such pre-treatment process includes irradiation of the glass substrate 81a with ultra violet (UV) and cleaning the surface with a solvent.

Figure 8C:
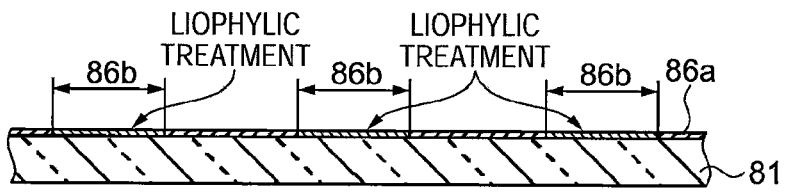

The step S2 shown in FIG. 7 is the hydrophilicity imparting process. In the step S2, a surface 86a treated with the liquid repellency imparting process is irradiated with a laser beam and hydrophilicity is imparted to the surface. The siloxane bond is broken in an area where is irradiated with the laser beam and it then couples to a hydroxyl group, and the area shows the hydrophilicity. In this embodiment, the area where should be irradiated with the laser beam is a region 86b where the partition wall 56 is going to be formed as shown in FIG. 8C.

As the laser beam, ones with a band width where generates heat are preferable. For example, the one whose wave length is in an infrared band (0.7-10 μm) is appropriate. A laser source having such wavelength includes for example a neodymium (Nd): yttrium aluminum garnet (YAG) laser (1.064 μm) and a CO2 laser (10.6 μm). A laser irradiation device equipped with such laser source and a table which is at least movable in X and Y directions is provided. The glass substrate 81 is placed on the table and the laser beam is irradiated so as to draw the region 86b. In this way, the hydrophilicity imparting process is performed.

An alternative method to impart the hydrophilicity to the thin film 86 made of FAS and the like, an area other than the region 86 where the hydrophilicity should be imparted is covered with a mask and the region can be irradiated with UV light.

Figure 8D:
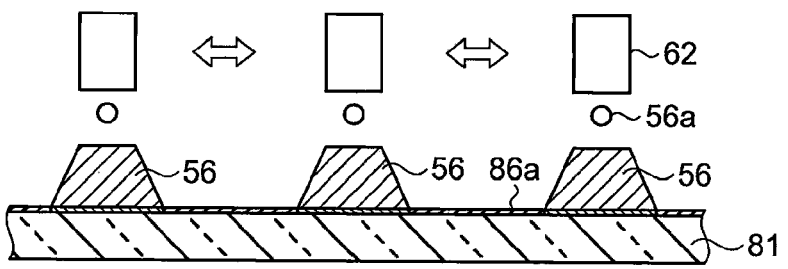

The step S3 shown in FIG. 7 is the partition wall forming process. In the step S3, the partition wall 56 is formed by using the above-described droplet discharge head 62 (see FIG. 5 and FIG. 6) as shown in FIG. 8D. The droplet discharge head 62 can discharge a liquid material in a droplet form from the nozzle as described above. A functional liquid Sa containing a partition wall forming material in a liquid form is discharged from the discharge head and the partition wall 56 is formed.

More specifically, the droplet discharge head 62 is set to a position corresponding to the region 86b where the partition wall 56 is going to be formed, and the functional liquid 56a is then discharged in a droplet form from the nozzle. The discharged droplet lands on the region and spreads out there. The spread liquid is then dried. Such process is repeated so as to deposit the partition wall 56. In this embodiment, the height of the partition wall 56 is for example about 1.5 μm. A solution containing a phenol based resin and the like as the partition wall forming material can be used as the functional liquid 56a.

Figure 8E:
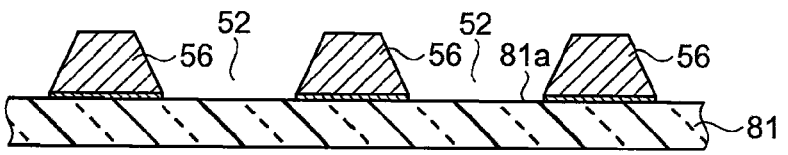

Next, in the step S4, the formed partition wall 56 is baked. In the following step S5, the thin film 86 remained on the glass substrate 81 on which the partition wall 56 has formed is removed as shown in FIG. 8E. The thin film 86 is a monomolecular film made of FAS and the like so that it cam be removed by heating the glass substrate 81 to about 300° C., subliming the thin film. Moreover, the hydrophilicity imparting process can be further performed to the surface 81a of the glass substrate 81 on which the thin film has been removed. The thin film 86 can also be removed by a UV irradiation, an $O_2$ plasma treatment or the like other than the heating. Furthermore, it is possible to simultaneously perform the step S4 and the step S5 if the whole of the glass substrate 81 is heated.

Figure 8F:
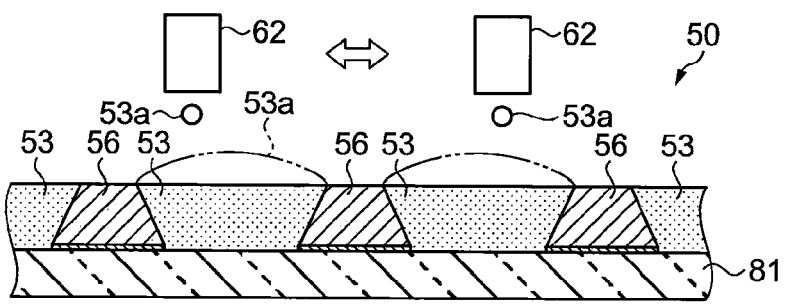

The step S6 shown in FIG. 7 is the color element forming process. In the step S6, a functional liquid 53a containing a color element forming material is discharged in a droplet form onto each color element region 52 defined by the partition wall 56 from the droplet discharge head 62 as shown in FIG. 8F. The discharged functional liquid is then dried and the color element 53 is formed. Here, the number of times discharging the functional liquid 53a is adjusted by each color element region in such a way that the film thickness of the dried color element 53 becomes substantially same as the height of the partition wall 56 (about 1.5 μm in this embodiment). A different functional liquid 53a containing a different color element material is discharged onto the color element region 52 where the color element 53 colored with a corresponding different color is formed. In case of the above-mentioned six color filter (see FIG. 4B and FIG. 4C), for example, six kinds of the functional liquid 53a containing six different color element materials are sequentially filled in the droplet discharge head 62 and discharged correspondingly to each of the color element forming regions 52 where six kinds of the color elements 53R, 53G, 53B, 53C, 53M and 53Y are formed. Alternatively, more than one droplet discharge head 62 can be provided. Each discharge head is filled with a different kind of the functional liquid 53a containing a different color element material and these functional liquids 53a are discharged from the discharge heads 62.

Next, in the step S87, the functional liquid 53a which has been discharged toward the color element forming region 52 and disposed in the color element forming region 52 is temporarily fixated or cured by performing drying or a pre-baking (temporary calcination) of a low temperature calcination (for example at 60° C.).

Next, in the following step S8, whether the discharge of the functional liquid 53a and the temporary calcination of the color elements of all the colors have finished or not is judged. If the discharge of the functional liquid 53a and the temporary calcination with respect to all colors in the color elements have not finished yet (NO at the step S8), go back to the step S6, and the discharge of the functional liquid 53a onto the color element forming region 52 (the step S6) and the temporary calcination of the functional liquid 53a provided in the color element forming region 52 (the step S7) will be repeatedly performed. If the discharge of the functional liquid 53a and the temporary calcination of all the colors in the color elements have finished (YES at the step S8), go to the next step S9. The discharge of the functional liquid 53a onto the color element forming region 52 (the step S6) and the temporary calcination of the functional liquid 53a provided in the color element forming region 52 (the step S7) can be performed by each color element colored with one color, or the discharge of the functional liquids 53a of all the colors onto the color element forming regions 52 (the step S6) can be performed then the temporary calcination of the functional liquids 53a of all the colors (the step S7) can be performed at once.

Next, in the step S9, the color filter substrate 10 formed through the above-described processes is inspected and existence of a defect is judged. This inspection is carried out by for example observing the partition wall 56 and the color element 53 by the naked eyes or through a microscope. In this case, the inspection may be carried out by an automated way such that taking a photo-image of the color filter substrate 10 and searching a defect based on the image. Here, defects of the color element 53 includes such cases as there is a unformed part in the color element 53 (so-called dot missing), the amount (volume) of the functional liquid 53a provided in the color element forming region 52 is not appropriate (too large or too small) though the color element 53 is formed, a foreign object such as dust is mixed or adhered though the color element 53 is formed, and the like.

If a defect in the color element 53 is found by the inspection (NO at the step S9), the color filter substrate 10 will be transferred to a substrate reproduction process which is a separate process from the above-described manufacturing processes, and the manufacturing process of the color filter substrate will be ended.

Figure 8G:
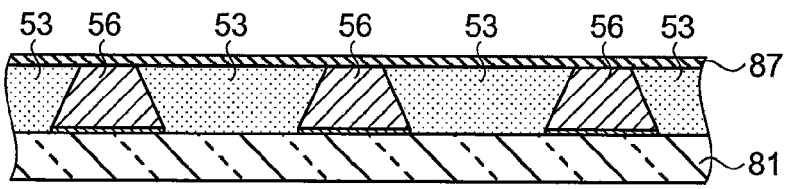

If any defects are not found in the display material by the e inspection (YES at the step S9), go to the next step S10. In the step S10, the color element 53 is completely fixated or cured by baking (calcinating) the color element 53 which has been temporarily baked. For example, the calcination at about 200° C. is performed and the color elements 53R, 53G, 53B, 53C, 53M and 53Y in the color filter substrate 10 are completely fixated or cured. This calcination temperature will be appropriately decided considering the composition of the functional liquid 53a and the like. Alternatively, the color element may be dried in an atmosphere (such as a nitrogen gas and a dried air) different from the normal room air or may be simply aged. Finally, a transparent protection layer 87 is formed over the color elements 53 as shown in FIG. 8G, and end the manufacturing process of the color filter substrate.

Manufacturing Method of Liquid Crystal Device

Figure 9:
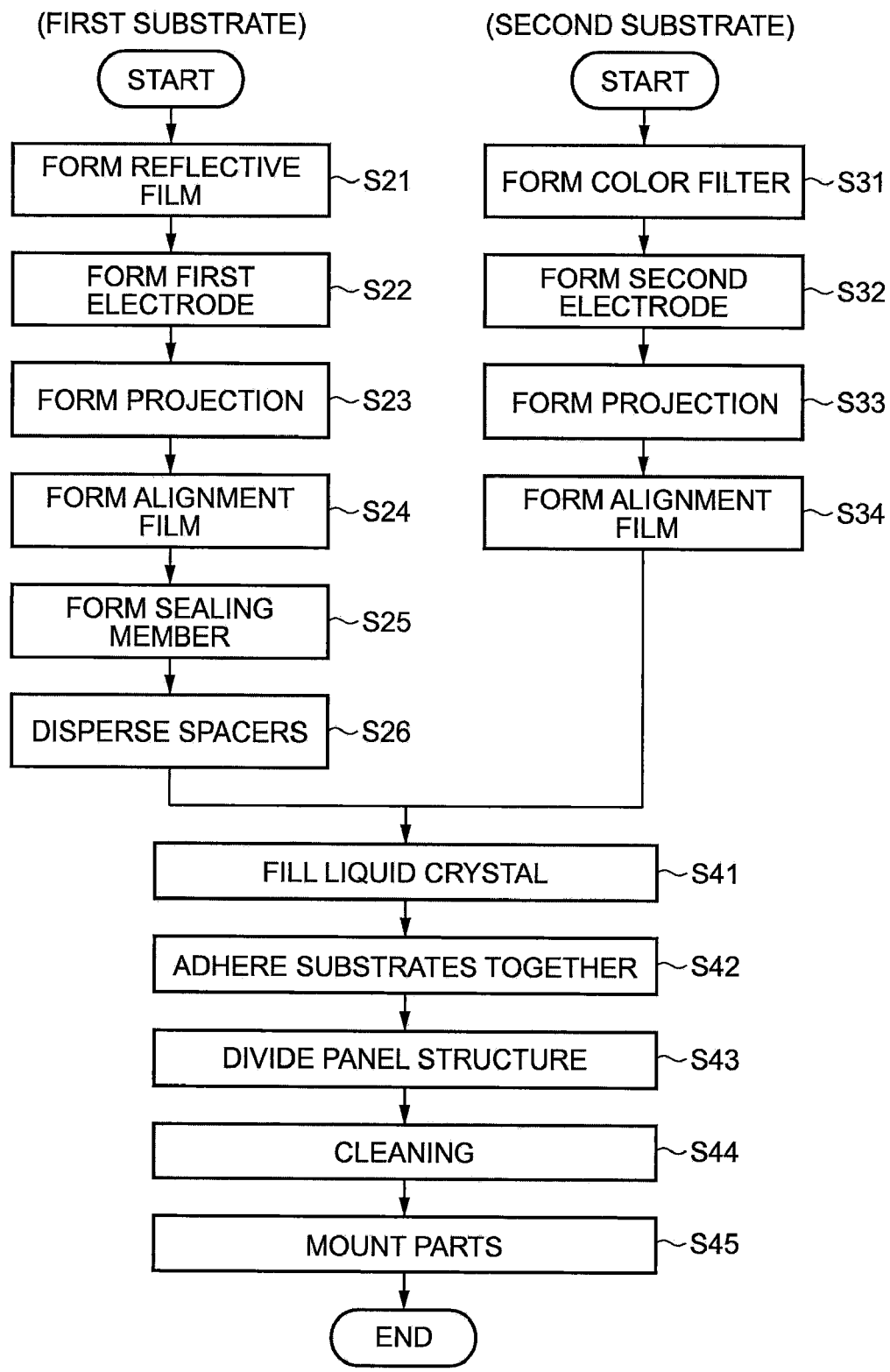
FIG. 9 is a flowchart showing manufacturing processes of a liquid crystal display device.

Next, manufacturing processes of the liquid crystal display device will be described. The liquid crystal display device 21 described above with reference to FIG. 1 and FIG. 2 can be manufactured by for example carrying out the manufacturing processes shown in FIG. 9. FIG. 9 is a flowchart showing manufacturing processes of the liquid crystal display device. In the manufacturing processes shown in FIG. 9, a series of steps from step S21 to step S26 is a process of forming the first substrate 27a, and a series of steps from step S31 to step S34 is a process of forming the second substrate 27b. The first substrate forming process is normally performed independently from the second substrate forming process.

The first substrate forming process is firstly described. In the step S21 shown in FIG. 9, the reflective films 32 (see FIG. 2) of the liquid crystal panel 22 are formed on the surface of the large mother base substrate made of transparent glass, plastic or the like by a photolithography method and the like. Subsequently, the insulating film 33 (see FIG. 2) is formed over the reflective films by a commonly known film forming method.

Next, in the following step S22, the first electrode 34a (see FIG. 1 and FIG. 2), the extraction electrodes 34c, 34d and the metal wirings 34e, 34f (see FIG. 1 and FIG. 2) are formed by a photolithography method, the above-mentioned droplet discharge method or the like.

Next, in the step S23, a projection 82a (see FIG. 11) that serves as an alignment control means is formed by a photolithography method, the above-mentioned droplet discharge method or the like.

In the following step S24, the alignment film 36a is formed over the first electrode 34a and the projection 82a by an application method, a printing method or the like. With this alignment film 36a, the liquid crystal molecule La of the liquid crystal L aligns vertically to the face of the alignment film 36a when a voltage is not applied to the electrodes. In other words, the molecules align in a direction vertical to the display face (see FIG. 11) of the liquid crystal display device 21.

Next, in the step S25, the sealing member 28 is formed in a circular form by for example screen printing. In the subsequent step S26, the spacers 39 having a sphere shape are dispersed in the region surrounded by the sealing member 28 that has been formed in the circular form. Through the above-described processes, the first substrate, which is the large mother substrate having a plurality of panel patterns on the first substrate 27a of the liquid crystal panel 22, is formed.

Figure 10A:
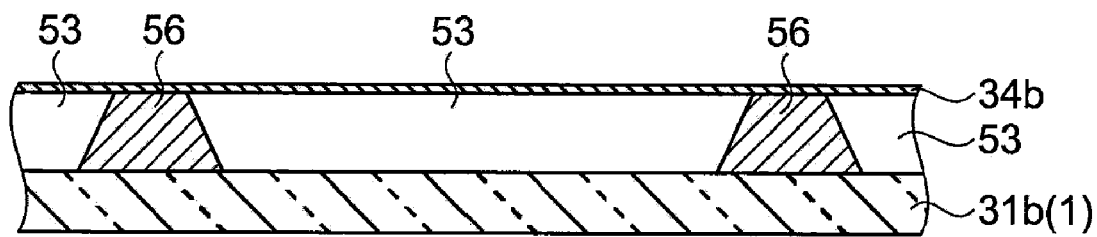
FIGS. 10A through 10C are schematic sectional views showing forming processes of the second substrate.
Figure 10B:
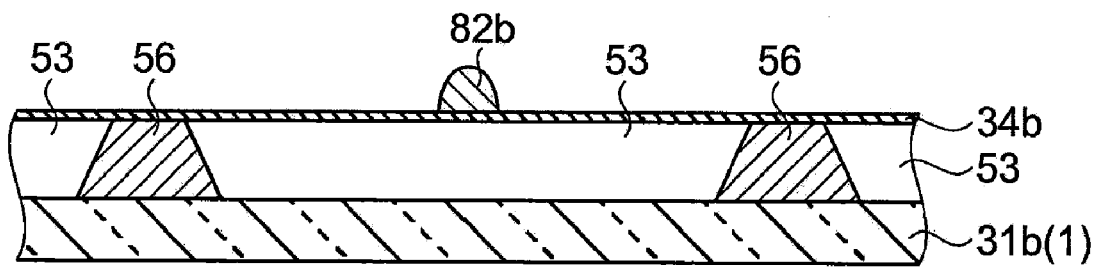
Figure 10C:
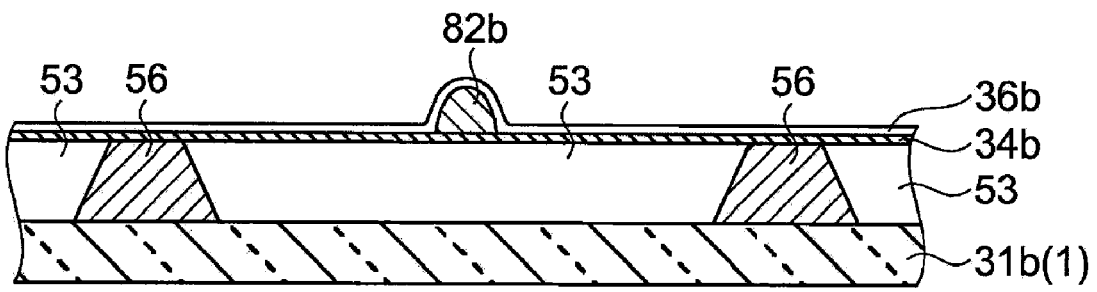

The second substrate forming process is carried out separately from the above-described first substrate forming process. FIGS. 10A through 10C are schematic sectional views showing forming processes of the second substrate. In the step S31 shown in FIG. 9, a large mother base substrate (the mother substrate 1, see FIG. 3) made of transparent glass, plastic or the like is prepared, and the color filters 38 (see FIG. 2) of the liquid crystal panel 22 are formed on the surface of the mother base substrate. The manufacturing process of these color filters is same as the manufacturing process of the color filter substrate 10 which was described above with reference to FIG. 7 and FIG. 8.

The step S31 is carried out and the color filter 50 or the color filters 38 are formed on the mother base substrate or the mother substrate 1 as shown in FIG. 8F. Next, the second electrode 34b shown in FIG. 10A is formed by a photolithography method and the like in the step S32.

In the subsequent step S33, a projection 82b (see FIG. 11) that serves as an alignment control means as shown in FIG. 10B is formed by a photolithography method, the above-mentioned droplet discharge method or the like.

In the step S34, the alignment film 36b is formed over the second electrode 34b and the projection 82b by an application method, a printing method or the like. With this alignment film 36a, the liquid crystal L aligns vertically to the face of the alignment film 36a when a voltage is not applied to the electrodes. In other words, the molecules align in a direction vertical to the display face of the liquid crystal display device 21. Through the above-described processes, the second substrate, which is the large mother substrate having a plurality of panel patterns on the second substrate 27b of the liquid crystal panel 22, is formed.

After the large mother first substrate and the mother second substrate have been formed, the area surrounded by the sealing member 28 circularly formed on the mother first substrate is filled with an appropriate amount of the liquid crystal L in the step S41.

In the subsequent step S42, the mother first substrate and the mother second substrate are aligned each other with the sealing member 28 therebetween and they are adhered together. In this way, a panel structure including a plurality of panel parts for the liquid crystal panels is completed. The step S41 and the step S42 are carried out in substantially vacuum so that the area surrounded by the sealing member 28 between the mother first substrate and the mother second substrate will be only filled with the liquid crystal L without incorporating air.

In the next step S43, a scribing groove or a groove for cutting is formed in a prescribed position of the completed panel structure. The panel structure is broken up or divided along the scribing groove into each piece. In this way, the liquid crystal panels 22 are cut out as an individual piece. Next, each liquid crystal panel 22 is cleaned in the step S44. In the subsequent step S45, the liquid crystal driving ICs 23a, 23b are mounted, the lighting device 26 is attached as the back light and the FPC 24 is coupled to each liquid crystal panel 22 as shown in FIG. 1. In this way, the aimed liquid crystal display device 21 is completed.

Liquid Crystal Alignment Direction Control by Projection

Figure 11:
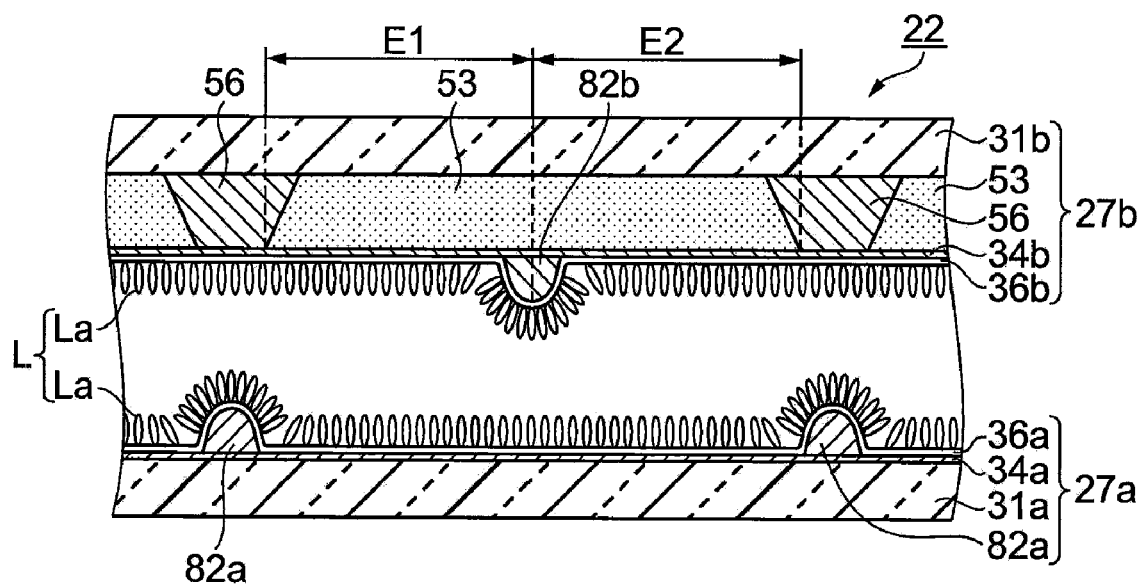
FIG. 11 is a sectional view of a liquid crystal panel in which a projection is formed on a surface that faces a liquid crystal layer showing an alignment direction of the liquid crystal when a driving voltage is not applied.

Next, control of the alignment direction of the liquid crystal L by the projection 82a and the projection 82b is explained. FIG. 11 is a sectional view of the liquid crystal panel showing an alignment direction of the liquid crystal when a driving voltage is not applied. As described above, the first substrate 27a has the first electrode 34a, the projection 82a and the alignment film 36a on the base member 31a. It is note that the reflective film 32 and the insulating film 33 are not shown in FIG. 11 since these structures will not affect the alignment of the liquid crystal. The second substrate 27b has the partition wall 56 and the color element 53 on the base member 31b. The second electrode 34b, the projection 82b and the alignment film 36b are formed over the partition wall 56 and the color element 53. The first substrate 27a and the second substrate 27b are adhered together such that the alignment film 36a opposes the alignment film 36b with a certain gap therebetween. The liquid crystal L is provided in the gap between the alignment film 36a and the alignment film 36b.

The liquid crystal molecule La of the liquid crystal L aligns vertically to the alignment film 36a or the alignment film 36b when a driving voltage is not applied between the first electrode 34a and the second electrode 34b as shown in FIG. 11. It follows that the liquid crystal molecules that are situated in a flat part of the alignment film 36a or the alignment film 36b except for the places of the projection 82a and the projection 82b align vertically to the face of the base member 31a and the base member 31b. The vertical direction to the faces of the base member 31a and the base member 31b is hereinafter referred as a "panel face vertical direction" and the direction that is orthogonal to the panel face vertical direction and parallel to the faces of the base member 31a and the base member 31b is hereinafter referred as a "panel face direction". The liquid crystal molecule La situated in the projection 82a and the projection 82b parts aligns vertically to the faces of the projections. The liquid crystal molecule La aligning vertically to the side faces of the projection 82a and the projection 82b inclines from the panel face vertical direction. Where the liquid crystal molecule La aligns in the panel face vertical direction, light is not transmitted through the liquid crystal layer.

When a prescribed driving voltage is applied between the first electrode 34a and the second electrode 34b, the liquid crystal molecule La lies substantially orthogonal to the direction of the applied electric field. Where the liquid crystal molecule La substantially aligns in the panel face direction, light is transmitted through the liquid crystal layer. If the applied voltage is low and the generated electric field is weak, the liquid crystal molecules are inclined at a degree corresponding to the intensity of the electric field between the panel face vertical direction and the panel face direction. By changing the degree of the liquid crystal molecules' alignment, the amount of transmitted light can be controlled and the brightness in the pixel can be adjusted. The color of the picture element can be changed by adjusting the brightness of each pixel that forms the picture element.

When a prescribed driving voltage is applied between the first electrode 34a and the second electrode 34b, the liquid crystal molecule La, which aligns vertically to the side faces of the projection 82a and the projection 82b so that it inclines from the panel face vertical direction, will turn to the direction in which the liquid crystal molecule initially inclined. Other liquid crystal molecules La next to the inclined liquid crystal molecule La are also affected and incline in the same direction. The liquid crystal molecules La situated in the region E1 shown in FIG. 11 incline in the same direction, and the liquid crystal molecules La situated in the region E2 incline in the same direction but different direction from the direction in which the liquid crystal molecules La situated in the region E1 incline. Accordingly, the area where the liquid crystal molecules La incline in the different directions is formed with the boundary formed between the projection 82a and the projection 82b when the driving voltage is applied. It follows that the color element forming region 52 is divided into more than one area by the projection 82a and the projection 82b and the alignment of the liquid crystal molecules is controlled in the color element forming region 52 so that it has different viewing angle dependencies. Consequently, the liquid crystal panel 22 has a wider viewing angle. Here, the projection 82a and the projection 82b correspond to the alignment control means.

Configuration of alignment control means in panel face direction

Figure 12:
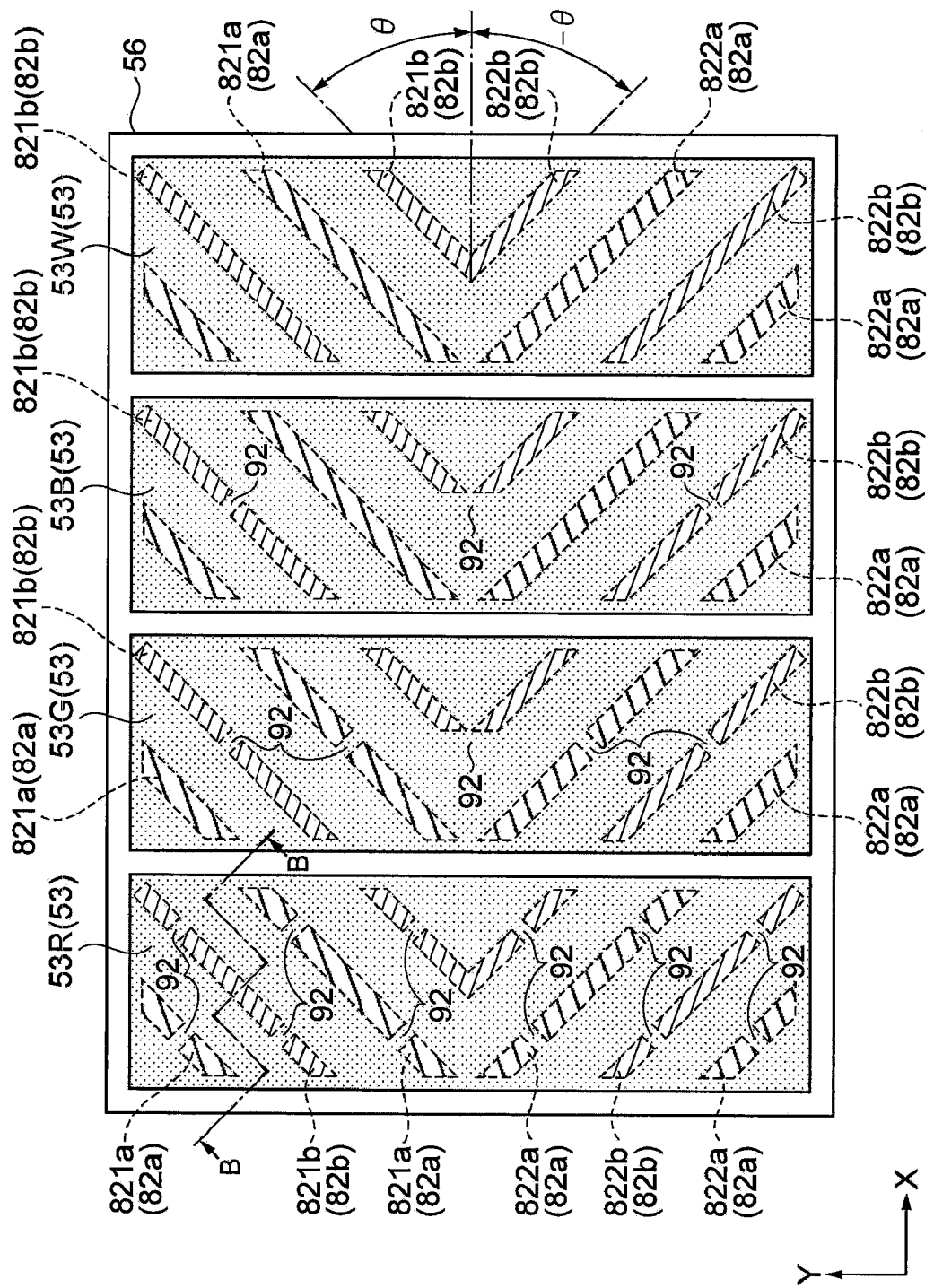
FIG. 12 is a plan view of a panel showing a configuration of projections in a single picture element of a four color filter.

Next, configurations of the projection 82a and the projection 82b in the panel face direction are described. FIG. 12 is a plan view of the panel showing a configuration of the projections in a single picture element of the four color filter in the panel face direction. The sectional figure along the line B-B in FIG. 12 is substantially same as the sectional figure shown in FIG. 11.

As shown in FIG. 12, a single picture element includes pixels corresponding to the color elements 53 of the primary three colors of red, green and blue which are the color elements 53R (red), 53G (green) and 53B (blue) and a pixel corresponding to the clear colorless color element 53 which is the color element 53W. The projection 82a formed in a single pixel area includes two kinds that extend in different directions which are a projection 821a and a projection 822a. Here, the direction in which the four kinds of the color elements 53 that form a single picture element align, which is the direction the color element 53R, the color element 53G, the color element 53B and the color element 53W align, is referred the X direction as shown in FIG. 12. The direction which is parallel to the panel face direction and orthogonal to the-X direction is referred the Y direction. The projection 821a extends in the direction at the angle θ with respect to the X direction. The projection 822a extends in the direction at the angle −θ with respect to the X direction. The projection 821a and the projection 822a respectively include ones having different length. In the same manner, the projection 82b formed in a single pixel area includes two kinds that extend in different directions, which are a projection 821b and a projection 822b. The projection 821b extends in the direction at the angle θ with respect to the X direction. The projection 822b extends in the direction at the angle −θ with respect to the X direction. The projection 821b and the projection 822b respectively encompass ones having different length. The direction inclining at the angle θ with respect to the X direction or the direction inclining at the angle −θ with respect to the X direction, in which the projection 82a or the projection 82b extends, corresponds to a first extending direction or a second extending direction.

The projections 821a, 821b, 822a, 822b that are situated in the pixel corresponding to the color element 53R respectively have one or two cols 92 where the projection is not formed. The projections are respectively divided into two or three by the cols 92. As for the projections 821a, 821b, 822a, 822b that are provided in the pixel corresponding to the color element 53G, the lengths of the projections 821a, 821b, 822a, 822b are relatively long and each has one col 92. Each projection in the pixel corresponding to the color element 53G is divided into two by the col 92. The projection 821b and the projection 822b placed around the center in the Y direction are respectively split by the col 92. The projection 821b and the projection 822b that are situated in the pixel corresponding to the color element 53B are long projections 821b, 822b, each having one col 92 that divides the projection into two. The projection 821b and the projection 822b placed around the center in the Y direction are respectively split by the col 92. In the pixel corresponding to the color element 53W, the projections 821a, 821b, 822a, 822b having no col 92 are formed. Since no projection 82a or 82b is formed in the part where the col 92 is formed, the projection 82a, 82b having the col 92 that divides the projection has a smaller area. Therefore, the total areas of the projection 82a and the projection 82b in the panel face direction differ according to the color element 53R, the color element 53G, the color element 53B and the color element 53W. In other words, the area of the projection occupying the area of the color element 53 differs depending on color.

Figure 13:
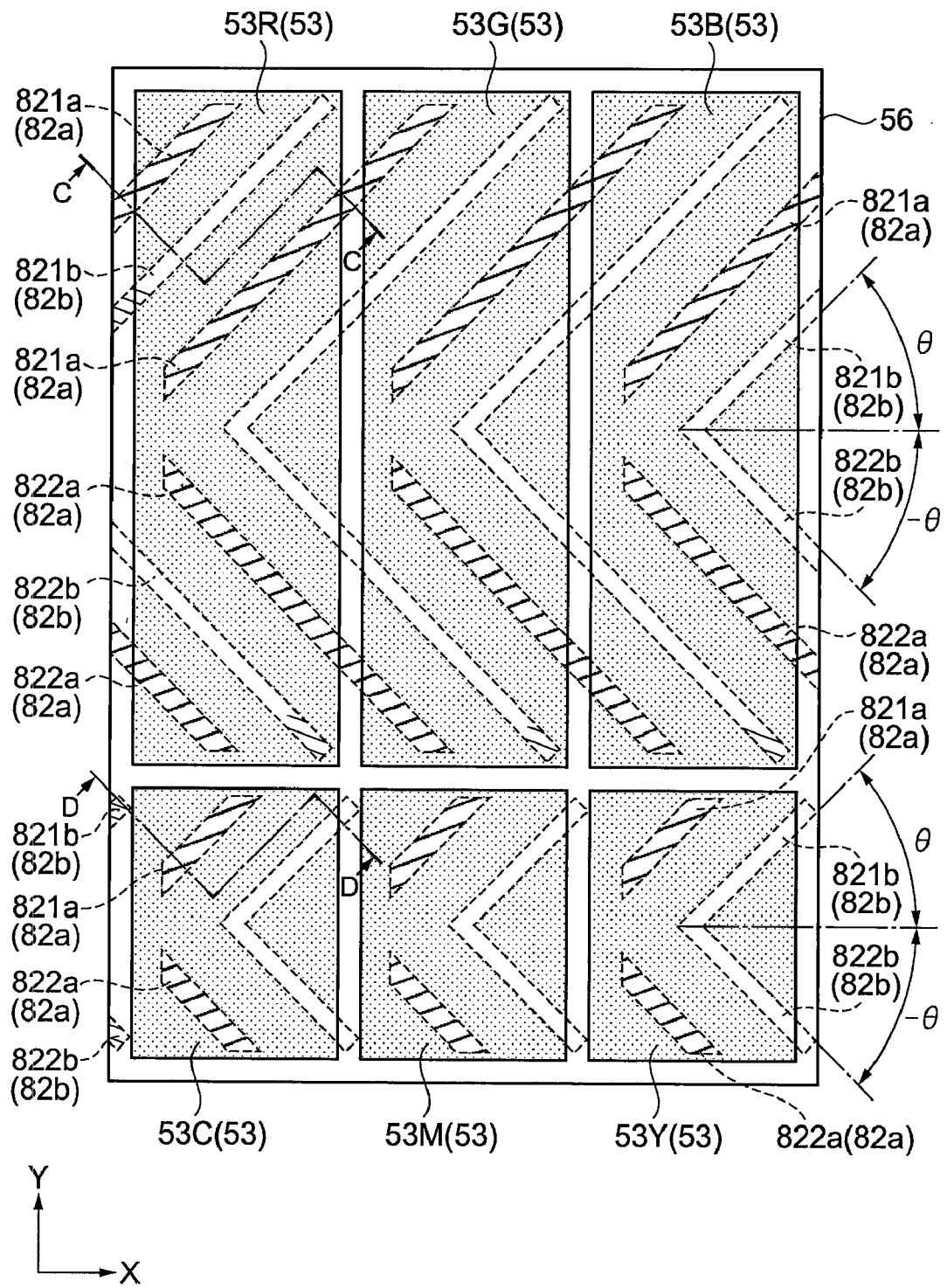
FIG. 13 is a plan view of a panel showing a configuration of projections in a single picture element of a six color filter.

Next, a configuration example of the projection 82a and the projection 82b in the panel face direction in the case of the six color filter is described. FIG. 13 is a plan view of a panel showing a configuration of projections in a single picture element of the six color filter. The sectional figure along the line C-C and line D-D in FIG. 13 is substantially same as the sectional figure shown in FIG. 11.

As shown in FIG. 13, a single picture element includes pixels corresponding to the color elements 53 of the primary three colors which are the color element 53R, the color element 53G and the color element 53B and pixels corresponding to the color elements 53 of the complementary colors of the primary three colors which are the color element 53C, the color element 53M and the color element 53Y. The projection 82a formed in a single pixel area includes two kinds that extend in different directions, which are the projection 821a and the projection 822a. Here, the direction in which the three kinds of the color elements 53 forming a single picture element align, which is the direction the color element 53R, the color element 53G, the color element 53B align, or the direction in which the other three kinds the color element 53C, the color element 53M and the color element 53Y align, is referred the X direction as shown in FIG. 13. The direction which is parallel to the panel face direction and orthogonal to the X direction is referred the Y direction. The projection 821a extends in the direction at the angle θ with respect to the X direction. The projection 822a extends in the direction at the angle −θ with respect to the X direction. The projection 821a and the projection 822a respectively include ones having different length. In the same manner, the projection 82b formed in a single pixel area includes two kinds that extend in different directions, which are the projection 821b and the projection 822b. The projection 821b extends in the direction at the angle θ with respect to the X direction. The projection 822b extends in the direction at the angle −θ with respect to the X direction. The projection 821b and the projection 822b respectively encompass ones having different length. The direction inclining at the angle θ with respect to the X direction or the direction inclining at the angle −θ with respect to the X direction, in which the projection 82a or the projection 82b extends, corresponds to the first extending direction or the second extending direction in this embodiment.

Among pixels forming a single picture element, in the pixels having substantially the same shape of the color element 53R, the color element 53G and the color element 53B, the projection 821a, the projection 822a, the projection 821b and the projection 822b are formed substantially in the same position and the same figure. In the same manner, the projection 821a, the projection 822a, the projection 821b and the projection 822b are formed substantially in the same position and the same figure in the pixels having substantially the same shape of the color element 53C, the color element 53M and the color element 53Y.

The area of the color element 53C, the color element 53M and the color element 53Y is about 40% of the area of the color element 53R, the color element 53G and the color element 53B. The dimension of each color element in the X direction is substantially same, and the dimension of the color element 53C, the color element 53M and the color element 53Y in the Y direction is about 40% of the dimension of the color element S3R, the color element 53G and the color element 53B in the Y direction. As described above, the extending direction of the projection 821a, the projection 822a, the projection 821b and the projection 822b, and the width of the projections in the direction orthogonal to the extending direction are all same in the color element 53C, the color element 53M, the color element 53Y and in the color element 53R, the color element 53G, the color element 53B. Accordingly, the areas of the projection 821a, the projection 822a, the projection 821b and the projection 822b are substantially proportional to the Y direction length so that the area of the projection 821a, the projection 822a, the projection 821b and the projection 822b formed in the color element 53C, the color element 53M and the color element 53Y is about 40% of the area of the projections formed in the color element 53R, the color element 53G and the color element 53B. Therefore, the ratio of the area of the projection 82a and the projection 82b formed in the color element 53C, the color element 53M and the color element 53Y to the pixel area is substantially same as the ratio of the area of the projection 82a and the projection 82b formed in the color element 53R, the color element 53G and the color element 53B to the pixel area.

Figure 14:
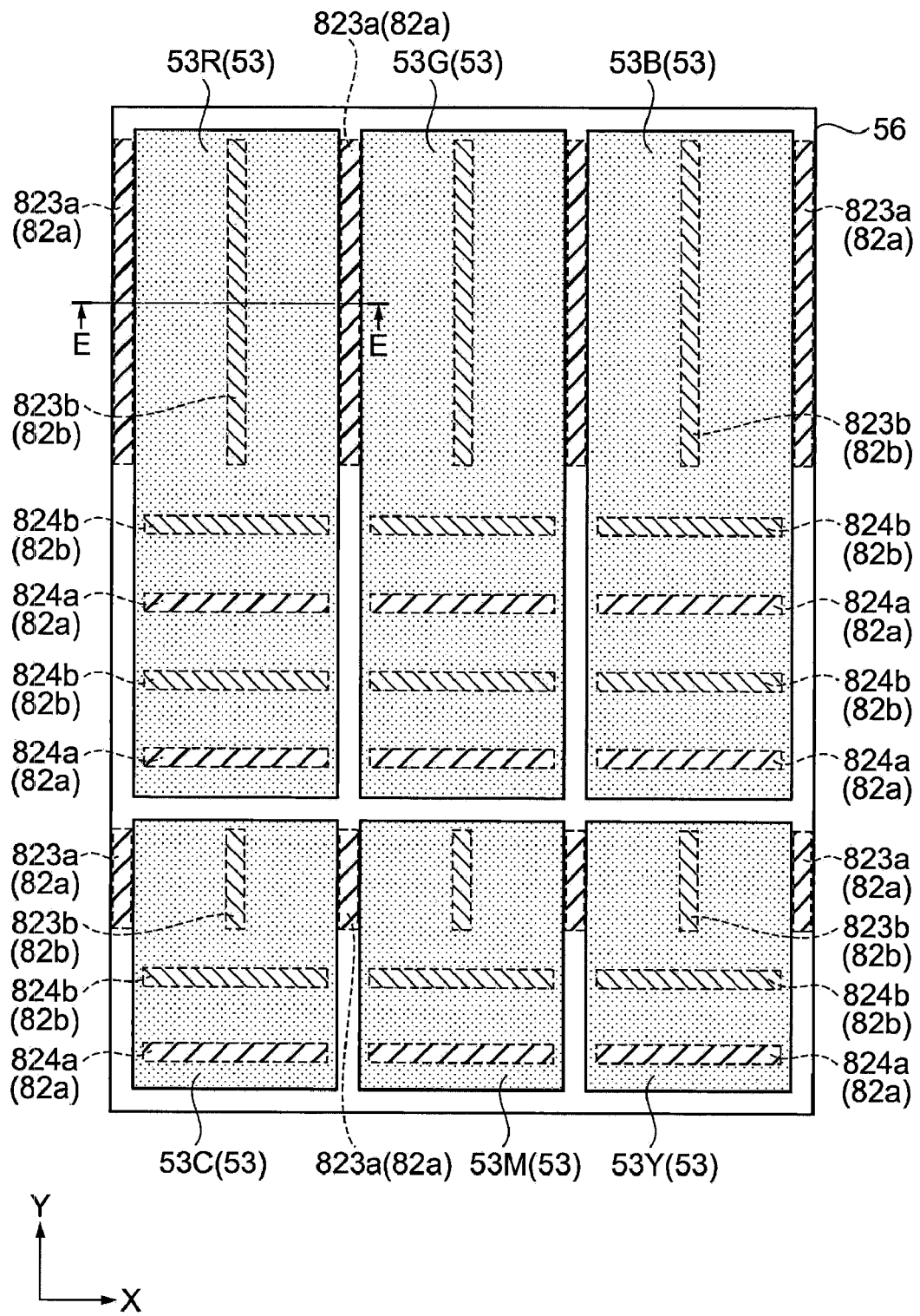
FIG. 14 is a plan view of a panel showing a configuration of projections in a single picture element of the six color filter.

Next, another configuration example of the projection 82a and the projection 82b in the panel face direction in the case of the six color filter is described. FIG. 14 is a plan view of the panel showing a configuration of projections in a single picture element of the six color filter. The sectional figure along the line E-E in FIG. 14 is substantially same as the sectional figure shown in FIG. 11.

As shown in FIG. 14, a single picture element includes pixels corresponding to the color elements 53 of the primary three colors which are the color element 53R, the color element 53G and the color element 53B and pixels corresponding to the color elements 53 of the complementary colors of the primary three colors which are the color element 53C, the color element 53M and the color element 53Y. The projection 82a formed in a single pixel area includes two kinds that extend in different directions, which are a projection 823a and a projection 824a. Here, the direction in which the three kinds of the color elements 53 forming a single picture element align, which is the direction the color element 53R, the color element 53G, the color element 53B align, or the direction in which the other three kinds the color element 53C, the color element 53M and the color element 53Y align, is referred the X direction as shown in FIG. 14. The direction which is parallel to the panel face direction and orthogonal to the X direction is referred the Y direction. The projection 823a extends in the Y direction and the projection 824a extends in the X direction. The projection 821a and the projection 822a respectively include ones having different length. In the same manner, the projection 82b formed in a single pixel area includes two kinds that extend in different directions, which are a projection 823b and a projection 824b. The projection 823b extends in the Y direction and the projection 824b extends in the X direction. The projection 823a and the projection 323b respectively encompass ones having different length. The X direction or the Y direction in which the projection 82a or the projection 82b extends corresponds to the first extending direction or the second extending direction in this embodiment.

Among pixels forming a single picture element, in the pixels having substantially the same shape of the color element 53R, the color element 53G and the color element 53B, the projection 823a, the projection 824a, the projection 823b and the projection 824b are formed substantially in the same position and the same figure. In the same manner, the projection 823a, the projection 824a, the projection 823b and the projection 824b are formed substantially in the same position and the same figure in the pixels having substantially the same shape of the color element 53C, the color element 53M and the color element 53Y.

As shown in FIG. 14, the area of the color element 53C, the color element 53M and the color element 53Y is smaller than the area of the color element 53R, the color element 53G and the color element 53B. The dimension of each color element in the X direction is substantially same, and the dimension of the color element 53C, the color element 53M and the color element 53Y in the Y direction is smaller than the dimension of the color element 53R, the color element 53G and the color element 53B in the Y direction. The projection 824a and the projection 824b are formed in each of the color element 53C, the color element 53M and the color element 53Y and two projections 824a and two projections 824b are formed in each of the color element 53R, the color element 53G and the color element 53B. The projection 823a and the projection 823b formed in the color element 53C, the color element 53M and the color element 53Y are shorter than the ones formed in the color element 53R, the color element 53G and the color element 53B. Consequently, the total area of the projection 823a, the projection 824a, the projection 823b and the projection 824b formed in the color element 53C, the color element 53M and the color element 53Y is smaller than the total area of the projection 823a, the projection 824a, the projection 823b and the projection 824b formed in the color element 53R, the color element 53G and the color element 53B.

Figure 15:
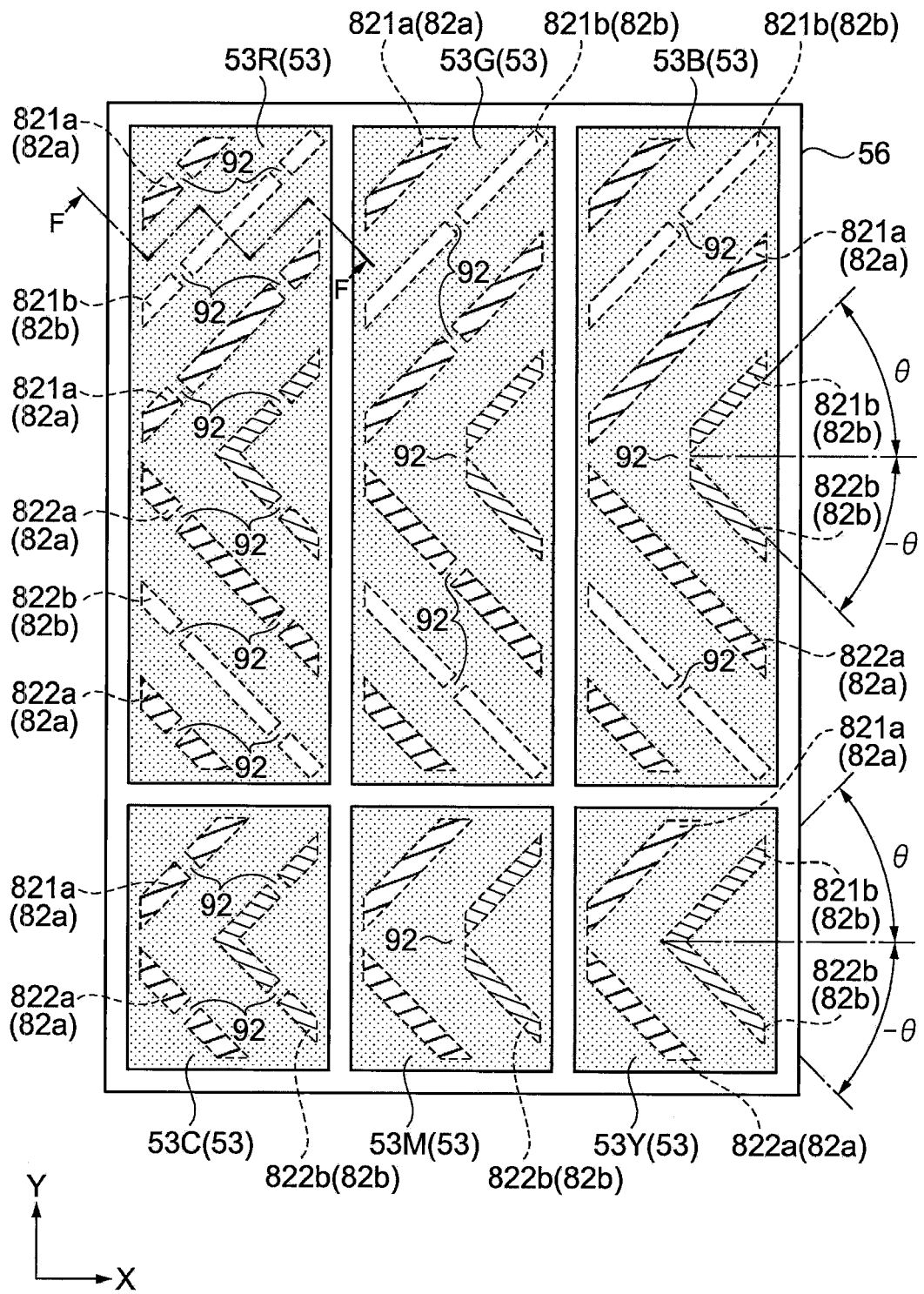
FIG. 15 is a plan view of a panel showing a configuration of projections in a single picture element of the six color filter.

Next, another configuration example of the projection 82a and the projection 82b in the panel face direction in the case of the six color filter is described. FIG. 15 is a plan view of the panel showing a configuration of projections in a single picture element of the six color filter. The sectional figure along the line F-F in FIG. 15 is substantially same as the sectional figure shown in FIG. 11.

As shown in FIG. 15, a single picture element includes pixels corresponding to the color elements 53 of the primary three colors which are the color element 53R, the color element 53G and the color element 53B and pixels corresponding to the color elements 53 of the complementary colors of the primary three colors which are the color element 53C, the color element 53M and the color element 53Y. The projection 82a formed in a single pixel area includes two kinds that extend in different directions, which are the projection 821a and the projection 822a. In the same way as the four color filter shown in FIG. 12, the direction in which the three kinds of the color elements 53 forming a single picture element align, which is the direction the color element 53R, the color element 53G, the color element 53B align, or the direction in which the other three kinds the color element 53C, the color element 53M and the color element 53Y align, is referred the X direction. The direction which is parallel to the panel face direction and orthogonal to the X direction is referred the Y direction. The projection 821a extends in the direction at the angle θ with respect to the X direction. The projection 822a extends in the direction at the angle −θ with respect to the X direction. The projection 821a and the projection 822a respectively include ones having different length. In the same manner, the projection 82b formed in a single pixel area includes two kinds that extend in different directions, which are the projection 821b and the projection 822b. The projection 821b extends in the direction at the angle θ with respect to the X direction. The projection 822b extends in the direction at the angle −θ with respect to the X direction. The projection 821b and the projection 822b respectively encompass ones having different length. The direction inclining at the angle θ with respect to the X direction or the direction inclining at the angle −θ with respect to the X direction, in which the projection 82a or the projection 82b extends, corresponds to the first extending direction or the second extending direction in this embodiment.

Among pixels forming a single picture element, in the pixels having substantially the same shape of the color element 53R, the color element 53G and the color element 53B, the projection 821a, the projection 822a, the projection 821b and the projection 822b are formed substantially in the same position and the same figure. In the same manner, the projection 821a, the projection 822a, the projection 821b and the projection 822b are formed substantially in the same position and the same figure in the pixels having substantially the same shape of the color element 53C, the color element 53M and the color element 53Y.

The projections 821a, 821b, 822a, 822b that are situated in the pixel corresponding to the color element 53R respectively have the one or two cols 92 where the projection is not formed. The projections are respectively divided into two or three by the cols 92. As for the projections 821a, 821b, 822a, 822b that are provided in the pixel corresponding to the color element 530, the lengths of the projections 821a, 821b, 822a, 822b are relatively long and each has the one col 92. Each projection in the pixel corresponding to the color element 53G is divided into two by the col 92. The projection 821b and the projection 822b placed around the center in the Y direction are respectively split by the col 92. The projection 821b and the projection 822b that are situated in the pixel corresponding to the color element 53B are long projections 821b, 822b, and each has one col 92 that divides the projection into two. The projection 821b and the projection 822b placed around the center in the Y direction are respectively split by the col 92.

Since no projections 82a, 82b are formed in the part where the col 92 is formed, the projection 82a, 82b having the col 92 that divides the projection has a smaller area. The projection 821a, the projection 822a, the projection 821b and the projection 822b are formed substantially in the same position and the same figure in the color element 53R, the color element 53G, the color element 53B but they are differently divided by the cols 92. Accordingly, the area of the projection 82a and the projection 82b in the panel face direction differ. Because the total area of the projection 82a and the projection 82b in the panel face direction differ according to the color element 53R, the color element 53G and the color element 53B, the area of the projection 82 occupying the color element 53 differs depending on color.

The projections 821a, 821b, 822a, 822b that are formed in the pixel corresponding to the color element 53C respectively have the one col 92 where the projection is not formed, and each projection is divided into two by the col 92. The projections 821a, 822a formed in the pixel corresponding to the color element 53M have no col 92. The projections 821b, 822b formed around the center in the Y direction in the pixel corresponding to the color element 53Y are respectively divided by the col 92. The col 92 is not formed in the projections 821a, 821b, 822a, 822b that are formed in the pixel corresponding to the color element 53Y.

The projection 821a, the projection 822a, the projection 821b and the projection 822b are formed substantially in the same position and the same figure in the color element 53C, the color element 53M, the color element 53Y but they are differently divided by the cols 92. Accordingly, the area of the projection 82a and the projection 82b in the panel face direction differ. Because the area of the projection 82a and the projection 82b in the panel face direction differ according to the color element 53C, the color element 53M and the color element 53Y, the area of the projection 82 occupying the color element 53 differs depending on color.

As described above, where the projections are not divided by the col 92, the ratio of the area of the projection 82a and the projection 82b formed in the color element 53C, the color element 53M and the color element 53Y to the pixel area is substantially same as the ratio of the area of the projection 82a and the projection 82b formed in the color element 53R, the color element 53G and the color element 53B to the pixel area. The ratio of the area of the projections 82a, 82b to the pixel area is substantially same even though the area of the color element 53C, the color element 53M and the color element 53Y is different from the area of the color element 53R, the color element 53G and the color element 53B. This means that the area of the projection 82a and the projection 82b formed in the color element 53C, the color element 53M and the color element 53Y is different from the area of the projection 82a and the projection 82b formed in color element 53R the color element 53G and the color element 53B.

The area of the projection 82 is different among the color elements 53 that have substantially the same area. The area of the projection 82 is also different among the color elements 53 that have different areas. This means that the areas of the projection 82a and the projection 82b that are formed in the color element 53R, the color element 53G, the color element 53B, the color element 53C, the color element 53M and the color element 53Y composing a single picture element differ by each pixel.

Liquid Crystal Alignment Direction Control by Groove or Projection

Figure 16A:
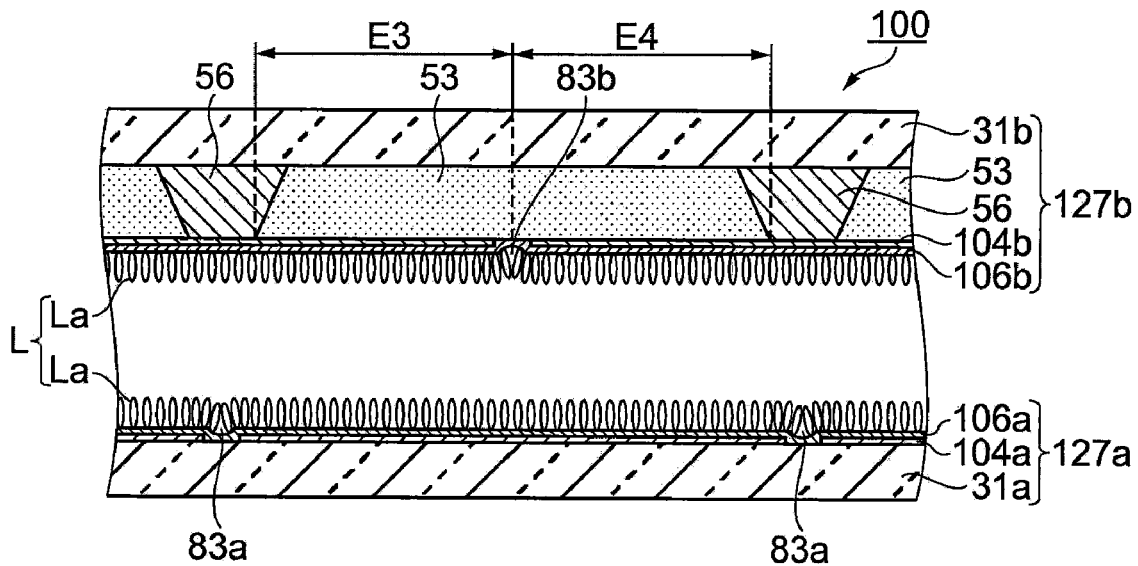
FIG. 16A is a sectional view of a liquid crystal panel in which a concave portion is formed on a surface that faces a liquid crystal layer showing an alignment direction of the liquid crystal when a driving voltage is not applied.
Figure 16B:
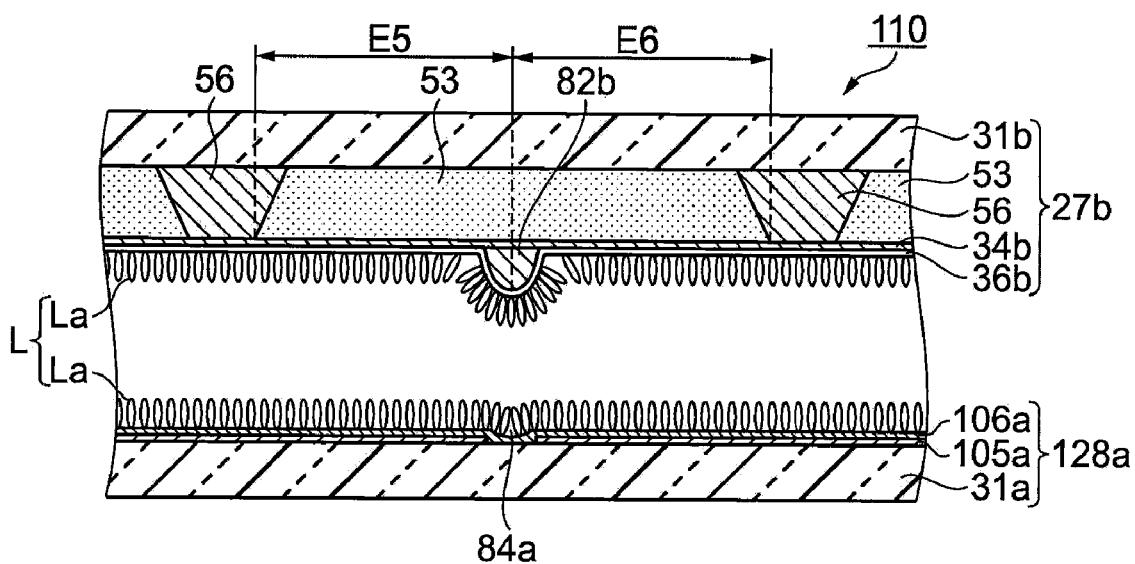
FIG. 16B is a sectional view of a liquid crystal panel in which a projection is formed on one surface that faces a liquid crystal layer and a concave portion is formed on the other face that faces the liquid crystal layer showing an alignment direction of the liquid crystal when a driving voltage is not applied.

Next, a groove form alignment control means which is another configuration example of the alignment control means is described. FIG. 16 is a sectional view of the liquid crystal panel on which a concave portion is formed on a surface facing the liquid crystal layer showing an alignment direction of the liquid crystal when a driving voltage is not applied, FIG. 16A is a sectional view of a liquid crystal panel having a first substrate and a second substrate on which a concave portion is formed on the surfaces that face a liquid crystal layer showing an alignment direction of the liquid crystal when a driving voltage is not applied. FIG. 16B is a sectional view of a liquid crystal panel in which a projection is formed on a surface of the second substrate facing a liquid crystal layer and a concave portion is formed on a surface of the first substrate facing the liquid crystal layer showing an alignment direction of the liquid crystal when a driving voltage is not applied.

In the same way as the above-described first substrate 27a, a first substrate 127a of a liquid crystal panel 100 shown in FIG. 16A has a first electrode 104a and an alignment film 106a on the base member 31a. A slit is formed in the first electrode 104a and a part of the alignment film 106a situated at the slit is dented and a concave portion 83a is formed there. It is note that the reflective film 32 and the insulating film 33 are not shown in FIG. 16 since these structures will not affect the alignment of the liquid crystal. A second substrate 127b has the partition wall 56 and the color element 53 on the base member 31b. A second electrode 104b and an alignment film 106b are formed over the partition wall 56 and the color element 53. A slit is formed in the second electrode 104b and a part of the alignment film 106b situated at the slit is dented and a concave portion 83b is formed there. The first substrate 127a and the second substrate 127b are adhered together such that the alignment film 106a opposes the alignment film 106b with a certain gap therebetween. The liquid crystal L is provided in the gap between the alignment film 106a and the alignment film 106b.

As described above, the liquid crystal molecule La of the liquid crystal L aligns vertically to the alignment film 106a or the alignment film 106b when a driving voltage is not applied between the first electrode 104a and the second electrode 104b. The liquid crystal molecule La situated in the concave portion 83a and the concave portion 83b parts aligns vertically to the faces of the concave portion. The liquid crystal molecule La aligning vertically to the side faces of the concave portion 83a and the concave portion 83b inclines from the panel face vertical direction. Where the liquid crystal molecule La aligns in the panel face vertical direction, light is not transmitted through the liquid crystal layer.

When a prescribed driving voltage is applied between the first electrode 104a and the second electrode 104b the liquid crystal molecule La lies substantially orthogonal to the direction of the applied electric field. Where the liquid crystal molecule La substantially aligns in the panel face direction, light is transmitted through the liquid crystal layer. If the applied voltage is low and the generated electric field is weak, the liquid crystal molecules are inclined at a degree corresponding to the intensity of the electric field between the panel face vertical direction and the panel face direction. By changing the degree of the liquid crystal molecules' alignment, the amount of transmitted light can be controlled and the brightness in the pixel can be adjusted. The color of the picture element can be changed by adjusting the brightness of each pixel that forms the picture element.

When a prescribed driving voltage is applied between the first electrode 104a and the second electrode 104b, the liquid crystal molecule La, which aligns vertically to the side faces of the concave portion 83a and the concave portion 83b so that it inclines from the panel face vertical direction, will turn to the direction in which the liquid crystal molecule initially inclined. Other liquid crystal molecules La next to the inclined liquid crystal molecule La are also affected and incline in the same direction. The liquid crystal molecules La situated in the region E3 shown in FIG. 16A incline in the same direction, and the liquid crystal molecules La situated in the region E4 incline in the same direction but a different direction from the direction in which the liquid crystal molecules La situated in the region E3 incline. Accordingly, the area where the liquid crystal molecules La incline in the different directions is formed with the boundary formed between the concave portion 83a and the concave portion 83b when the driving voltage is applied. It follows that the color element forming region 52 is divided into more than one area by the concave portion 8Sa and the concave portion 83b and the alignment of the liquid crystal molecules is controlled in the color element forming region 52 so that it has different viewing angle dependencies. Consequently, the liquid crystal panel 100 has a wider viewing angle. Here, the concave portion 83a and the concave portion 83b correspond to the alignment control means.

Formation conditions of the concave portion such as the extending direction of the concave portion 83a and the concave portion 83b in the panel face direction, the area in which the concave portion extends, the position where the concave portion is formed and the like are for example same as those of the projection 82a and the projection 82b described with reference to FIGS. 12 through 15.

In the same way as the above-described first substrate 127a, a first substrate 128a of a liquid crystal panel 110 shown in FIG. 16B has a first electrode 105a and the alignment film 106a on the base member 31a. A slit is formed in the first electrode 105a and a part of the alignment film 106a situated at the slit is dented and a concave portion 84a is formed there. A second substrate of the liquid crystal panel 110 is the same one as the above-described second substrate 27b and it has the partition wall 56 and the color element 53 on the base member 31b. The second electrode 34b, the projection 82b and the alignment film 36b are formed over the partition wall 56 and the color element 53. The first substrate 128a and the second substrate 27b are adhered together such that the alignment film 106a opposes the alignment film 36b with a certain gap therebetween. The liquid crystal L is provided in the gap between the alignment film 106a and the alignment film 36b. The concave portion 84a and the projection 82b extend in the panel face direction and the concave portion 84a and the projection 82b extend in the substantially same direction. The concave portion 84a and the projection 82b substantially overlap each other in the panel face vertical direction.

As described above, the liquid crystal molecule La of the liquid crystal L aligns vertically to the alignment film 106a or the alignment film 36b when a driving voltage is not applied between the first electrode 105a and the second electrode 34b. The liquid crystal molecule La situated in the concave portion 84a and the projection 82b parts aligns vertically to the faces of the concave portion 84a and the projection 82b. The liquid crystal molecule La aligning vertically to the side faces of the concave portion 84a and the projection 82b inclines from the panel face vertical direction. As shown in FIG. 16B, the concave portion 84a and the projection 82b oppose and overlap each other in the panel face vertical direction so that the liquid crystal molecule La is inclined by the concave portion 84a in the same direction as the direction in which the liquid crystal molecule is inclined by the projection 82b.

When a prescribed driving voltage is applied between the first electrode 105a and the second electrode 34b, the liquid crystal molecule La lies substantially orthogonal to the direction of the applied electric field. Where the liquid crystal molecule La substantially aligns in the panel face direction, light is transmitted through the liquid crystal layer. If the applied voltage is low and the generated electric field is weak, the liquid crystal molecules are inclined at a degree corresponding to the intensity of the electric field between the panel face vertical direction and the panel face direction. By changing the degree of the liquid crystal molecules' alignment, the amount of transmitted light can be controlled and the brightness in the pixel can be adjusted. The color of the picture element can be changed by adjusting the brightness of each pixel that forms the picture element.

When a prescribed driving voltage is applied between the first electrode 105a and the second electrode 34b, the liquid crystal molecule La, which aligns vertically to the side faces of the concave portion 84a and the projection 82b so that it inclines from the panel face vertical direction, will turn to the direction in which the liquid crystal molecule initially inclined. Other liquid crystal molecules La next to the inclined liquid crystal molecule La are also affected and incline in the same direction. The liquid crystal molecules La situated in the region E5 shown in FIG. 16B incline in the same direction, and the liquid crystal molecules La situated in the region E6 incline in the same direction but a different direction from the direction in which the liquid crystal molecules La situated in the region E5 incline. Accordingly, the area where the liquid crystal molecules La incline in the different directions is formed with the boundary formed between the concave portion 84a and the projection 82b when the driving voltage is applied. It follows that the color element forming region 52 is divided into more than one area by the concave portion 84a and the projection 82b and the alignment of the liquid crystal molecules is controlled in the color element forming region 52 so that it has different viewing angle dependencies, Consequently, the liquid crystal panel 110 has a wider viewing angle. When the driving voltage applied, the liquid crystal molecules La incline in the opposite directions with the boundary formed between the concave portion 84a and the projection 82b. This means that the middle position of the adjacent concave portion 84a and the projection 82b becomes a parting point where the liquid crystal molecule La falls opposite direction. In the FIG. 16B, this parting point is formed around the center of the partition wall 56. Here, the concave portion 84a and the projection 82b correspond to the alignment control means.

Formation conditions of the projection 82b such as the extending direction of the projection 82b in the panel face direction, the area in which the projection extends, the position where the projection is formed and the like are for example same as those of the projection 82b described with reference to FIGS. 12 through 15. The extending direction of the concave portion 84a in the panel face direction and the formed position of the concave portion 84a are the extending direction and the position that overlap the extending direction and the position of the projection 82b described with reference to FIGS. 12 through 15.

Here, advantageous effects of the above-described first embodiment are described.

I. In the picture element shown in FIGS. 12 through 15, the areas of the alignment control means formed in the region corresponding to the color elements 53 in the picture element differ according to the color element. In other words, the area in which the projection 82a, the projection 82b, the concave portion 83a, the concave portion 83b and the concave portion 84a extends differs according to color element. The area of the projection 82a, the projection 82b, the concave portion 83a, the concave portion 83b and the concave portion 84a in each colored pixel of the picture element is prescribed in consideration of the balance among the colors of the pixels. By individually setting the area of which the alignment control means stretches by each color, it is possible to realize an appropriate color balance as well as to widen the viewing angle by controlling the alignment of the liquid crystal with the alignment control means.

II. According to the picture element shown in FIGS. 12 through 15, the area of which the alignment control means extends differs by the pixel that corresponds to the color element 53 of the three primary colors, which are the color element 53R, the color element 53G and the color element 53B. In other words, the area in which the alignment control means such as the projection 82a and the projection 82b stretches out differs depending on the color of the color element 53. It follows that the area of which the projection 82a, the projection 82b and the like extends is prescribed according to the three primary colored pixels forming the picture element in consideration of the balance among the three colors. By individually setting the area of which the alignment control means including the projection 82a and the projection 82b stretches out by each color, it is possible to realize an appropriate color balance of the colors in a triangle formed in the gamut of the three primary colors of light as well as to widen the viewing angle by controlling the alignment of the liquid crystal in the pixels having the color elements of the three primary colors with the alignment control means.

III. According to the picture element shown in FIG. 15, the area of which the projection 82a and the projection 82b extend in the pixel that corresponds to the color element 53 of the complementary colors of the three primary colors, which are the color element 53C, the color element 53M and the color element 53Y, differs depending on the color of the color element 53. In other words, the area of which the projection 82a, the projection 82b and the like extends in the pixel is prescribed according to the complementary colors of the three primary colors forming the picture element in consideration of the balance among the three complementary colors. By individually setting the area of which the alignment control means including the projection 82a and the projection 82b stretches out by each color in the three complementary colors, it is possible to realize an appropriate color balance of the colors in a triangle formed in the gamut of the complementary colors of the three primary colors as well as to widen the viewing angle by controlling the alignment of the liquid crystal in the pixels having the color elements of the complementary colors of the three primary colors with the alignment control means.

IV. In the picture element shown in FIG. 13, FIG. 14 and FIG. 15, the area of which the projection 82a, the projection 82b and the like extend in the pixel corresponding to the color element 53R is different from the area of which the projection 82a, the projection 82b and the like extend in the pixel corresponding to the color element 53C which is the complementary color of the color element 53R. The area of which the projection 82a, the projection 82b and the like stretches out in the pixel corresponding to the color element 53G is different from the area of which the projection 82a, the projection 82b and the like stretches out in the pixel corresponding to the color element 53M which is the complementary color of the color element 53G. The area of which the projection 82a, the projection 82b and the like extend in the pixel corresponding to the color element 53B is different from the area of which the projection 82a, the projection 82b and the like extend in the pixel corresponding to the color element 53Y which is the complementary color of the color element 53B. The area of the projection 82a, the projection 82b and the like in the pixel colored with one color of the picture element or its complementary color is prescribed in consideration of the balance between the color and its complementary color. By individually setting the area of which the alignment control means stretches by each color and the complementary color, it is possible to realize an appropriate color balance as well as to widen the viewing angle of the color and the complementary color by controlling the alignment of the liquid crystal with the alignment control means.

V. In the picture element shown in FIG. 12 and FIG. 15, the area of which the projection 82a, the projection 82b and the like extends in the region corresponding to each color element 53 differs by colors though each color element has the same effective area irrespective of the color. In other words, the area of which the projection 82a, the projection 82b and the like stretches out in each color pixel that has the same effective area forming the picture element is prescribed in consideration of the balance among the colors of the pixels. By individually setting the area of which the alignment control means including the projection 82a and the projection 82b stretches out by each color element 53 having the same effective area, it is possible to realize an appropriate color balance of the colors in a triangle formed in the gamut of the colors of the color elements 53 having the identical effective area as well as to widen the viewing angle by controlling the alignment of the liquid crystal in the pixels having the color elements 53 of the same effective area with the alignment control means.

VI. In the picture element shown in FIG. 13 and FIG. 14, the area of which the projection 82a, the projection 82b and the like extends in the region corresponding to each color element 53 differs by colors. Each color element 58 has a different effective area by color. In other words, the area of which the projection 82a, the projection 82b and the like stretches out in each color pixel that has a different effective area forming the picture element is prescribed in consideration of the balance among the colors of the pixels. The effective area is varied by color so as to obtain an appropriate color balance. By individually setting the area of which the alignment control means including the projection 82a and the projection 82b stretches out according to the effective area of each color element 53, it is possible to widen the viewing angle by controlling the alignment of the liquid crystal in the pixels having the color elements 53 with different effective areas with the alignment control means, as well as to realize an appropriate color balance in the widened viewing angle.

Second Embodiment

Next, electronic equipment according to an embodiment of the invention will be explained. The electronic equipment of this embodiment is electronic equipment having the liquid crystal display device described in the first embodiment. A specific example of the electronic equipment according to the embodiment is described.

Figure 17:
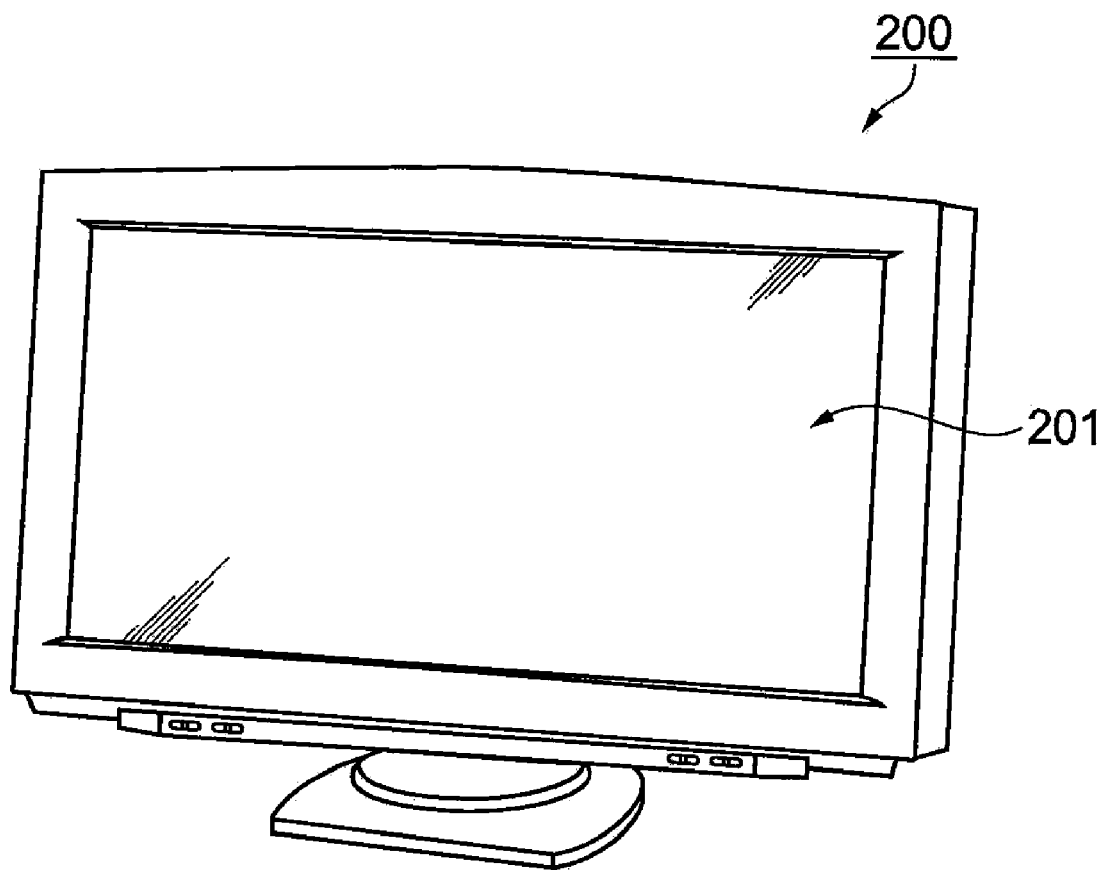
FIG. 17 is a perspective view showing the exterior of a large liquid crystal television set as an example of electronic equipment of the invention.

FIG. 17 is a perspective view showing the exterior of a large liquid crystal television set as an example of the electronic equipment. A large liquid crystal television set 200 which is an example of the electronic equipment has a display part 201 as show in FIG. 17. The display part 201 includes the liquid crystal display device 21 described in the first embodiment above as a display means.

Advantageous Effects of the Second Embodiment are Followed

I. A viewing angle is widened in the large liquid crystal television set 200 by controlling the alignment direction of the liquid crystal with the alignment control means. Furthermore, the area of which the alignment control means such as the projection 82a and the projection 82b extends is by individually set by each color element so that the liquid crystal device has a widened viewing angle with an appropriate color balance. With such liquid crystal device, it is possible to realize the large liquid crystal television set 200 with a fine color balance and a wide viewing angle.

Though the preferred embodiments have been described with reference to the accompanying drawings, the foregoing description has been given by way of example only and it will be appreciated by a person skilled in the art that modifications can be made without departing from the scope of the invention. Here are some modification examples.

FIRST MODIFICATION EXAMPLE

Though the liquid crystal panel has the stripe shaped electrodes on the top and bottom substrates in the above-described embodiment, the display device is not necessarily the liquid crystal panel having the strip shaped electrodes. The display device may be a TFT panel in which pixels are controlled by using thin film transistors (TFTs) or may be a TFD panel in which pixels are controlled by using thin film diodes (TFDs). In case of the TFT or TFD panel. an element substrate on which TFTs or TFDs are formed corresponds to the electrode substrate and a substrate that opposes the element substrate corresponds to the opposing substrate.

SECOND MODIFICATION EXAMPLE

Though the multi-domain vertical alignment (MVA) type liquid crystal display device was described in the above embodiment the liquid crystal device may be an in-plane switching (IPS) type liquid crystal display device. In this case, gaps among adjacent electrodes will be the alignment control means

THIRD MODIFICATION EXAMPLE

In the above-described embodiment, the concave portions 83a, 83b and 84a are formed by making slits in the pixel electrodes including the first electrode 104a, the second electrode 104b and the first electrode 105a. However, the concave portion may be formed in a different way other than making a slit in a pixel electrode. For example, a same material as the material of the projection can be deposited on the whole face except for some area, and the concave portion can be formed in the part where the material is not deposited.

FOURTH MODIFICATION EXAMPLE

In the four color filter, the area of which the alignment control means extends differs by each color element pixel in the above-described embodiment. However, the area of which the alignment control means extends does not necessarily differ in every color element. The area of which the alignment control means stretches out may be varied at least in three color pixels. By making the area of the alignment control means different by at least each of three color pixels, at least the color balance among the three colors can be adjusted. Accordingly, it is possible to obtain an appropriate color balance of the colors situated in a triangle that has three apexes corresponding to the three colors in the gamut.

FIFTH MODIFICATION EXAMPLE

In the six color filter in the above-described embodiment, the area of which the alignment control means extends differs by each pixel corresponding to the color element 53. However, the area of which the alignment control means extends does not necessarily differ in every color element. The area of which the alignment control means stretches out may be varied for example in any three color pixels.

SIXTH MODIFICATION EXAMPLE

The area of which the alignment control means extends differs among the pixels corresponding to the color elements 53 colored with the three primary colors and among the pixels corresponding to the color elements 53 colored with the complementary colors of the three primary colors in the above-described embodiment. However, this is not the only case, for example, the area of which the alignment control means extends may differ either only among the pixels corresponding to the color elements 53 colored with the three primary colors or among the pixels corresponding to the color elements 53 colored with the complementary colors of the three primary colors.

SEVENTH MODIFICATION EXAMPLE

In the above described embodiment, the alignment control means such as the projection 82a, the projection 82b, the concave portion 83a, the concave portions 83b and the concave portions 84a are provided on the both of the first substrate 27a and the second substrate 27b or on the both of the first substrate 127a and the second substrate 127b. However, the alignment control means is not necessarily provided on the both of the first substrate and the second substrate, For example, the alignment control means may be provided on only one of the first substrate or the second substrate.

EIGHTH MODIFICATION EXAMPLE

Though the cases of the four color filter and the six color filter were described in the above embodiment, the multi color filter is not limited to four colors or six colors. The number of the colors of the color elements may be any number more than three.

NINTH MODIFICATION EXAMPLE

Though the four color filter has the color elements 52 colored with the four colors of red (R), green (G), blue (B) and clear colorless (W) in the above described embodiment, the four color is not limited to these four colors of the red (R), green (C), blue (B) and clear colorless (W). The four color filter may be a filter having other four color elements such as a four complementary color filter having color elements of cyan (C), magenta (M), yellow (Y) and green.

TENTH MODIFICATION EXAMPLE

Though the six color filter has the color elements 52 colored with the six colors of red (R), green (G), blue (B) cyan (C), magenta (M) and yellow (Y) in the above described embodiment, the six color is not limited to these six colors of the red (R), green (G), blue (B) cyan (C), magenta (M) and yellow (Y). The six color filter may be a filter having other color elements colored with different six colors.

ELEVENTH MODIFICATION EXAMPLE

Though the projection 82, the concave portion 83 and the concave portion 84 that extend in different direction in the area of one color element in the above-described embodiment, the alignment control means extends in the single color element 53 dose not necessarily extend in two directions. The direction of which the alignment control means extends in the single color element 53 may be for example one or three.

TWELFTH MODIFICATION EXAMPLE

Though the color filter is formed on the second substrate in the above-described embodiment, the color filter is not necessarily formed on the second substrate. The color filter may be formed on the first substrate. For example, in case of the TFT panel, the color filter may be formed on the element substrate on which TFTs are formed, or may be formed on the opposing substrate that opposes the element substrate with the liquid crystal layer interposed therebetween.

THIRTEENTH MODIFICATION EXAMPLE

The color element region 52 is formed by forming the partition wall 56, and the color element 53 is formed by filling the color element region 52 with a color element material in the above-described embodiment. However, it is not essential to form the partition wall 56. The color elements 53 may be formed next to each other such that they directly contact each other.

FOURTEENTH MODIFICATION EXAMPLE

Though the droplet discharge method is used to form the partition wall 56 and the color element 53 in above-described embodiment, the partition wall 56 and the color element 53 are not necessarily formed by the droplet discharge method. The partition wall 56 and the color element 53 may be formed by other forming methods such as a photography method and a printing method.

FIFTEENTH MODIFICATION EXAMPLE

Though the liquid crystal display device that displays an image on the display screen of the device was described as the liquid display in above-described embodiment, the invention can be applied to any device using liquid crystal such as a liquid crystal projector in addition to the liquid crystal display device displaying an image on the display screen of the device

SIXTEENTH MODIFICATION EXAMPLE

In the six color filter described in the above embodiment, the areas of the color elements of the complementary colors of the three primary colors of light, which are the color elements 53C, 53M, 53Y colored with cyan (C), magenta (M) and yellow (Y), are smaller than the areas of the color elements 53R, 53G, 53B colored with red (R), green (G) and blue (B). However, the areas of the color elements 53C, 53M, 53Y are not necessarily smaller than the areas of the color elements 53R, 53G, 53B. The areas of the color elements 53C, 53M, 53Y may be larger or equal to the areas of the color elements 53R, 53G, 53B.

SEVENTEENTH MODIFICATION EXAMPLE

Though the shape of the color element 53 or the pixel was square and the shape of the picture element composed of the pixels was also square in the above-described embodiment, the shape of the pixel and the picture element is not necessarily square. For example, the shape of the pixel may be a triangle and the shape of the picture element may be a triangle, trapezoid or hexagon made by a combination of the triangular pixels. Or the shape of the pixel may be a hexagon and the picture element may be formed by a combination of the hexagonal pixels. The picture element can be formed by combining pixels having different shapes.

EIGHTEENTH MODIFICATION EXAMPLE

The picture element 54, 57 has the color elements 53 each of which corresponds to one color in the colors in the picture element in the above described embodiment. However, the color elements forming are not necessarily formed such that a single color element is formed for one of the colors in the picture element. More than one color element may be colored with the same color and provided in the single picture element filter so as to be scattered in the picture element filter.

NINETEENTH MODIFICATION EXAMPLE

The area of the projection 82 was varied by providing the col 92 or changing the direction in which the projection 82 extends in the above described embodiment. However, the way to change the area of each projection 82 is not necessarily limited to the methods by providing the col 92 or changing the direction in which the projection 82 extends. The area of each projection 82 may be varied by changing the width of the projection 82 which is the length substantially orthogonal to the extending direction of the projection 82.

The entire disclosure of Japanese Patent Application No, 2006-42011, filed Feb. 20, 2006 is expressly incorporated by reference herein.

What is claimed is:

1. A liquid crystal device, comprising:
   an electrode substrate having a plurality of pixel electrodes;
   an opposing substrate opposing the electrode substrate;
   a color filter having color elements, each color element opposing each of the pixel electrodes;
   a liquid crystal disposed between the electrode substrate and the opposing substrate; and
   an alignment control member extending on a face of at least one of the electrode substrate or the opposing substrate, the face contacting with the liquid crystal,
   wherein the color element includes a first color element whose effective area through which light is transmitted is a first area and a second color element whose effective area through which light is transmitted is a second area, an area of which the alignment control member formed in a position corresponding to the first color element or the second color element extends is determined by color, and a third area of which the alignment control member formed in the position corresponding to the first color element extends is different from a fourth area of which the alignment control member formed in the position corresponding to the second color element extends, and
   wherein a ratio of the third area of which the alignment control member formed in the position corresponding to the first color element extends to an area of the first color element is the same as a ratio of the fourth area of which the alignment control member formed in the position corresponding to the second color element extends to an area of the second color element.

2. The liquid crystal device according to claims 1, wherein the alignment control member is formed in a position that corresponds to a color element colored with one of at least three predetermined colors among four colors or more, and wherein the predetermined colors are three primary colors of red, green and blue.

3. The liquid crystal device according to claim 1, wherein the alignment control member is formed in a position that corresponds to a color element that is colored with a color other than red, green, and blue, and the area of which the alignment control member extends differs among the colors.

4. The liquid crystal device according to claim 1, wherein the alignment control member is formed in a position that corresponds to a color element colored with one of at least three predetermined colors among four colors or more, and wherein the predetermined colors are any of complementary colors of the primary three colors of the red, green and blue, which are cyan, magenta and yellow.

5. The liquid crystal device according to claim 4, wherein the alignment control member is formed in a position that corresponds to a color element that is colored with a color other than the complementary colors of the three primary colors, and the area of which the alignment control member extends differs among the colors.

6. The liquid crystal device according to claim 1, wherein a second alignment control member is formed in a position that corresponds to a color element with one of at least three predetermined colors among four colors or more, wherein a first alignment control member is formed in a position that corresponds to a color element that is colored with a color other than the predetermined colors, the area of which the first alignment control member extends differs among the colors, and this area is different from an area of which the second alignment control member extends.

7. The liquid crystal device according to claim 1, wherein the area of which the alignment control member extends differs among the colors of the color elements.

8. The liquid crystal device according to claim 1, wherein the area of which the alignment control member extends in the color element is changed by changing a number of the alignment control members extending in the color element.

9. The liquid crystal device according to claim 1, wherein the area of which the alignment control members extends in the color element is changed by changing an area of each of the alignment control members extending in the color element.

10. The liquid crystal device according to claim 1, wherein the alignment control member extends in a first direction and a second direction, and the alignment control member that is formed corresponding to the single color element includes an first alignment control member extending in the first direction and an second alignment control member extending in the second direction.

11. The liquid crystal device according to claim 1, wherein the alignment control member is a projection or a concave portion formed on the face contacting with the liquid crystal.

12. The liquid crystal device according to claim 11, wherein either the projection or the concave portion or both of the projection and the concave portion are formed by each of the color elements.

13. The liquid crystal device according to claim 11, wherein the concave portion is formed by forming a slit in the pixel electrode.

14. The liquid crystal device according to claim 10 claim 1, wherein the alignment control member is a gap between the adjacent pixel electrodes.

15. Electronic equipment, comprising the liquid crystal device to claim 1.

* * * * *